United States Patent
Seki

(10) Patent No.: US 9,041,808 B2
(45) Date of Patent: May 26, 2015

(54) HEADLIGHT CONTROLLER, OPTICAL UNIT AND VEHICLE HEADLIGHT

(71) Applicant: Stanley Electric Co., Ltd., Tokyo (JP)

(72) Inventor: Hirokazu Seki, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 180 days.

(21) Appl. No.: 13/791,888

(22) Filed: Mar. 8, 2013

(65) Prior Publication Data

US 2013/0242100 A1 Sep. 19, 2013

(30) Foreign Application Priority Data

Mar. 8, 2012 (JP) ................................. 2012-051879
Mar. 8, 2012 (JP) ................................. 2012-051977

(51) Int. Cl.
*G06T 5/00* (2006.01)
*B60Q 1/04* (2006.01)
*B60Q 1/08* (2006.01)
*F21S 8/10* (2006.01)

(52) U.S. Cl.
CPC *B60Q 1/04* (2013.01); *B60Q 1/085* (2013.01); *F21S 48/1159* (2013.01); *F21S 48/1747* (2013.01); *B60Q 2300/056* (2013.01); *B60Q 2300/41* (2013.01); *B60Q 2300/112* (2013.01); *B60Q 2300/122* (2013.01); *B60Q 2300/42* (2013.01); *F21S 48/115* (2013.01)

(58) Field of Classification Search
USPC ......................................................... 348/148
See application file for complete search history.

(56) References Cited

U.S. PATENT DOCUMENTS

| 4,733,335 | A | 3/1988 | Serizawa et al. |
| 5,101,326 | A | 3/1992 | Roney |
| 6,273,596 | B1 | 8/2001 | Parkyn, Jr. |
| 6,850,001 | B2 | 2/2005 | Takekuma |

(Continued)

FOREIGN PATENT DOCUMENTS

| DE | 10 2007 040 042 A1 | 2/2009 |
| DE | 10 2009 057 391 A1 | 12/2010 |

(Continued)

OTHER PUBLICATIONS

Partial European Search Report for the related European Patent Application No. 13001161.2 dated Oct. 25, 2013.

(Continued)

*Primary Examiner* — Sath V Perungavoor
*Assistant Examiner* — Jeffery Williams
(74) *Attorney, Agent, or Firm* — Kenealy Vaidya LLP

(57) ABSTRACT

A headlight controller, an optical unit and a vehicle headlight can include a headlight controller and an optical unit. The headlight controller can include a system controller and a camera photographing vehicles located in a forward direction thereof, and the system controller can be configured to output a control signal to provide various favorable light distribution patterns by using image data output from the camera in accordance with traffic conditions. The optical unit can be configured to emit beam lights each having a light-emitting angle using lights emitted from first and second white LEDs via a projector lens so that the beam lights can be used as a high and low beam without movable parts. Thus, the disclosed subject matter can include providing vehicle headlights that can form various favorable light distribution patterns by utilizing the characteristics of the controller and the optical unit in accordance with the traffic conditions.

10 Claims, 25 Drawing Sheets

(56) References Cited

U.S. PATENT DOCUMENTS

| | | |
|---|---|---|
| 7,128,454 B2 | 10/2006 | Kim et al. |
| 2005/0068786 A1 | 3/2005 | Ishida |
| 2005/0094413 A1 | 5/2005 | Sazuka et al. |
| 2005/0219856 A1 | 10/2005 | Tatsukawa |
| 2008/0007961 A1 | 1/2008 | Mochizuki et al. |
| 2009/0092284 A1* | 4/2009 | Breed et al. ............ 382/103 |
| 2010/0232173 A1 | 9/2010 | Ohno |
| 2011/0125369 A1* | 5/2011 | Roh et al. ............... 701/41 |
| 2011/0249222 A1 | 10/2011 | Nakagawa et al. |
| 2011/0249460 A1 | 10/2011 | Kushimoto |
| 2011/0309388 A1 | 12/2011 | Ito |
| 2012/0025218 A1 | 2/2012 | Ito |
| 2012/0235169 A1 | 9/2012 | Seko |

FOREIGN PATENT DOCUMENTS

| | | |
|---|---|---|
| EP | 2 156 983 A1 | 2/2010 |
| JP | 2005-141919 A | 6/2005 |
| JP | 2005-294176 A | 10/2005 |
| JP | 2006-172829 A | 6/2006 |
| JP | 2007-5182 A | 1/2007 |
| JP | 2008-13014 A | 1/2008 |
| JP | 2010-219324 A | 9/2010 |
| JP | 2011-31807 A | 2/2011 |
| JP | 2011-31808 A | 2/2011 |
| JP | 2011-100785 A | 5/2011 |
| JP | 2011-221371 A | 11/2011 |
| JP | 2012-9760 A | 1/2012 |

OTHER PUBLICATIONS

Extended European Search Report for the related European Patent Application No. 13001161.2 dated Mar. 3, 2014.

List of Potentially Related Pending U.S. Appl. No. 13/748,099 to Mika Mochizuki, filed Jan. 23, 2013 and U.S. Appl. No. 14/154,821, filed Jan. 14, 2014.

* cited by examiner

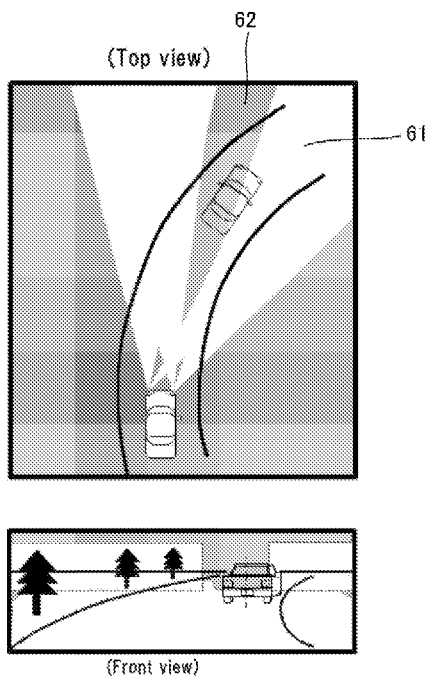
FIG. 3a Comparative embodiment 1
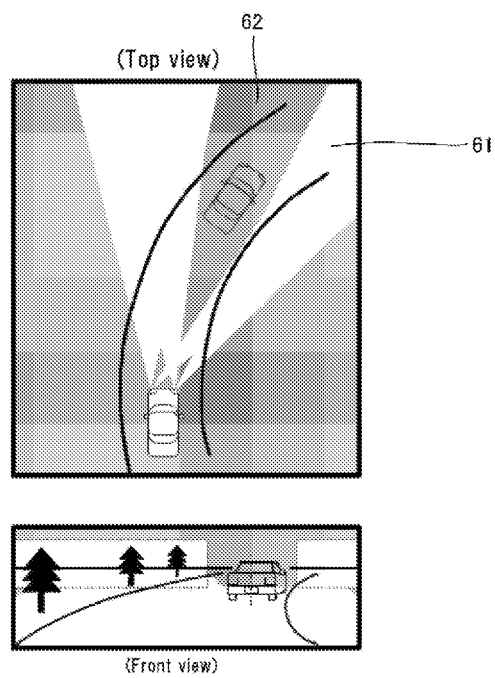
FIG. 3b Exemplary embodiment 1

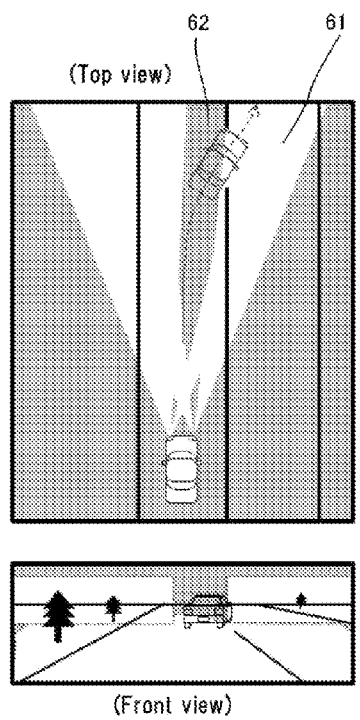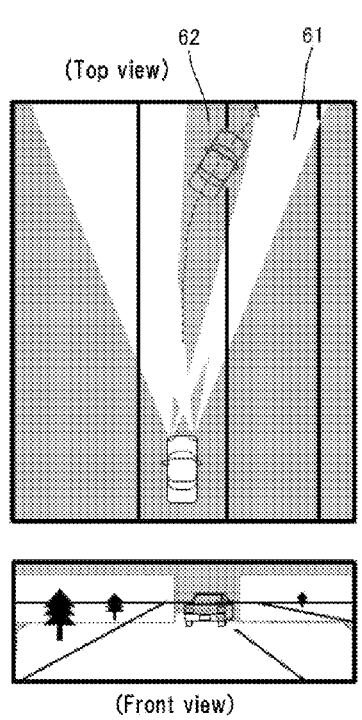
FIG. 4a  Comparative embodiment 2
FIG. 4b  Exemplary embodiment 2

$A3 \fallingdotseq A5 < A2 \fallingdotseq A6 < A1 \fallingdotseq A7$

FIG. 8a
FIG. 8b
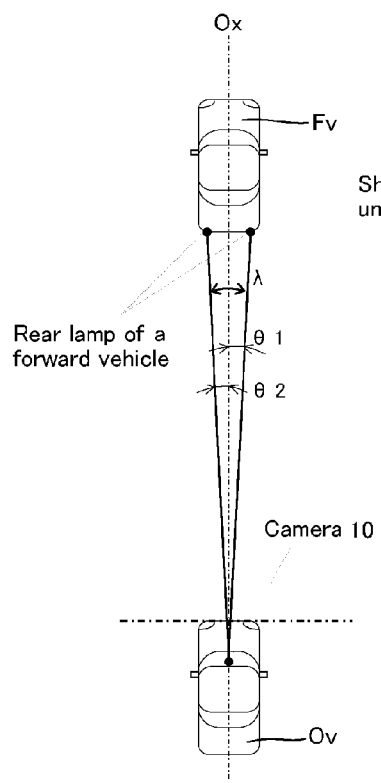
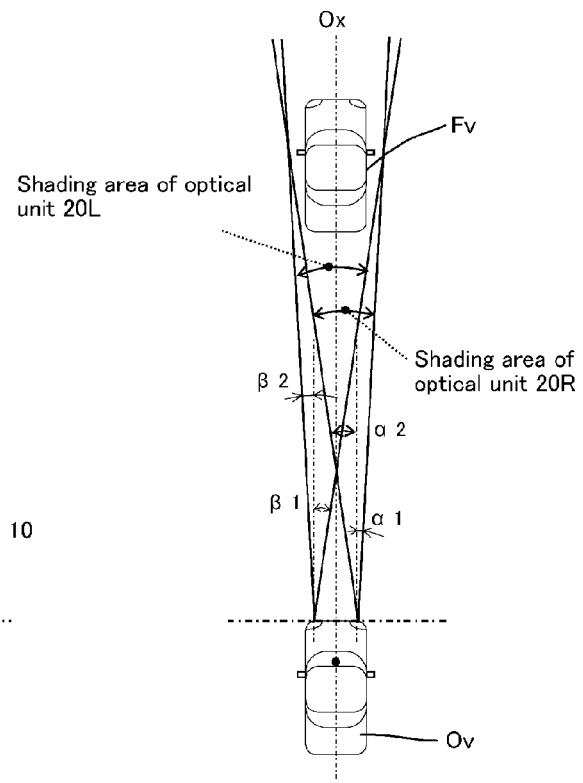

FIG. 9a
FIG. 9b
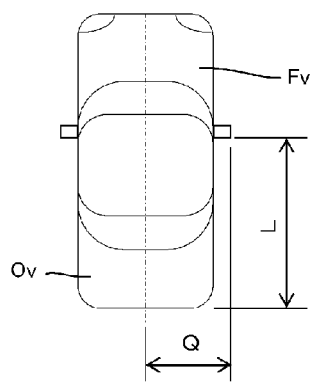
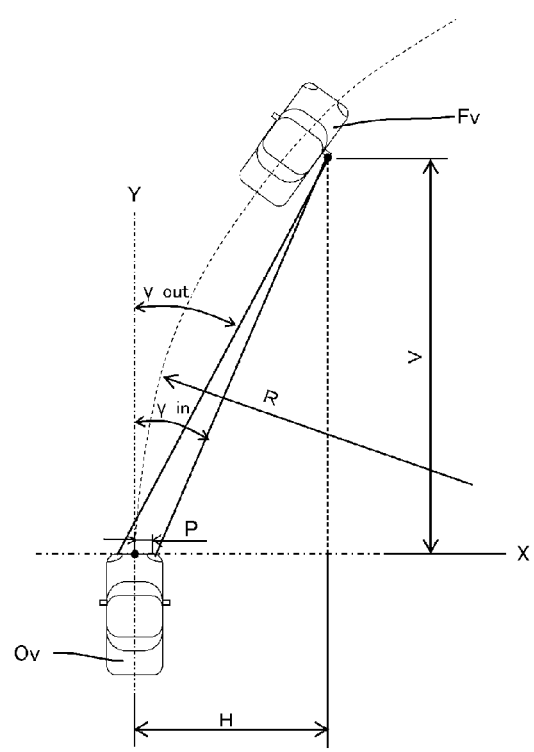

FIG. 11

| Forward vehicle | | | Boundary angle | | Basic value | | Revised value | | Total value | |
|---|---|---|---|---|---|---|---|---|---|---|
| $\rho$ (deg) | D (m) | $\lambda$ (deg) | AL (deg) | AR (deg) | $\beta1$ (deg) | $\alpha1$ (deg) | Ul (deg) | Ur (deg) | $\beta1$+Ul (deg) | $\alpha1$+Ur (deg) |
| 15 | 20 | 3.87 | 6.32 | 3.00 | 5.05 | 1.95 | 2.04 | 1.05 | 7.09 | 3.00 |
| | 40 | 1.93 | 3.46 | 1.64 | 2.51 | 0.97 | 1.11 | 0.68 | 3.62 | 1.65 |
| | 60 | 1.29 | 2.38 | 1.13 | 1.68 | 0.65 | 0.76 | 0.49 | 2.44 | 1.14 |
| | 80 | 0.97 | 1.81 | 0.86 | 1.27 | 0.49 | 0.58 | 0.38 | 1.85 | 0.87 |
| | 100 | 0.78 | 1.46 | 0.69 | 1.01 | 0.39 | 0.47 | 0.31 | 1.48 | 0.70 |
| | 150 | 0.52 | 0.99 | 0.47 | 0.68 | 0.26 | 0.32 | 0.21 | 0.99 | 0.47 |
| 30 | 20 | 3.48 | 8.84 | 5.46 | 4.55 | 1.77 | 5.03 | 3.79 | 9.58 | 5.56 |
| | 40 | 1.74 | 4.79 | 2.95 | 2.27 | 0.88 | 2.75 | 2.14 | 5.02 | 3.02 |
| | 60 | 1.16 | 3.28 | 2.02 | 1.51 | 0.58 | 1.88 | 1.48 | 3.39 | 2.06 |
| | 80 | 0.87 | 2.50 | 1.54 | 1.14 | 0.44 | 1.43 | 1.13 | 2.57 | 1.57 |
| | 100 | 0.70 | 2.01 | 1.24 | 0.91 | 0.35 | 1.16 | 0.92 | 2.07 | 1.27 |
| | 150 | 0.46 | 1.36 | 0.84 | 0.60 | 0.23 | 0.77 | 0.61 | 1.37 | 0.84 |
| 45 | 20 | 2.83 | 11.09 | 7.62 | 3.71 | 1.45 | 7.92 | 6.20 | 11.63 | 7.65 |
| | 40 | 1.42 | 5.93 | 4.05 | 1.86 | 0.72 | 4.23 | 3.35 | 6.09 | 4.07 |
| | 60 | 0.95 | 4.04 | 2.76 | 1.24 | 0.48 | 2.89 | 2.30 | 4.13 | 2.78 |
| | 80 | 0.71 | 3.06 | 2.09 | 0.93 | 0.36 | 2.18 | 1.74 | 3.11 | 2.10 |
| | 100 | 0.57 | 2.46 | 1.68 | 0.75 | 0.29 | 1.76 | 1.41 | 2.51 | 1.70 |
| | 150 | 0.38 | 1.66 | 1.13 | 0.49 | 0.19 | 1.18 | 0.95 | 1.68 | 1.14 |

FIG. 12

| Own vehicle | Forward vehicle | Estimation algorithm | |
| --- | --- | --- | --- |
| | | Left boundary | Right boundary |
| Turning left | Big move leftward | Second basic value + Revised value — 74 | Basic value |
| | Small move leftward | Second basic value + Revised value | Basic value |
| | No change | Second basic value — 73 | Basic value |
| | Small move rightward | Second basic value − Revised value — 75 | Basic value |
| | Big move rightward | Basic value + Revised value — 76 | Basic value |
| Turning right | Big move leftward | Basic value | Basic value + Revised value — 76 |
| | Small move leftward | Basic value | Second basic value + Revised value — 75 |
| | No change | Basic value | Second basic value — 73 |
| | Small move rightward | Basic value | Second basic value − Revised value |
| | Big move rightward | Basic value | Second basic value + Revised value — 74 |
| Straight line | Big move leftward | Basic value + Revised value — 72 | Basic value |
| | Small move leftward | Basic value + Revised value | Basic value |
| | No change | Basic value | Basic value — 71 |
| | Small move rightward | Basic value | Basic value + Revised value — 72 |
| | Big move rightward | Basic value | Basic value + Revised value |

FIG. 18

(degree)

| Angle of forward vehicle with respect to own vehicle | FIG. 17a | | | FIG. 17b | | |
|---|---|---|---|---|---|---|
| ω | τ1 | τ2 | τ3 | ν1 | ν2 | ν3 |
| 5 | -3.79 | 36.45 | 21.71 | -34.65 | 3.97 | 6.22 |
| 10 | 2.07 | 16.73 | 15.65 | -9.87 | 4.62 | 7.19 |
| 15 | 6.25 | 14.07 | 14.89 | -2.01 | 6.76 | 9.18 |
| 20 | 8.04 | 14.21 | 15.67 | 2.86 | 9.10 | 11.30 |
| 25 | 10.70 | 15.95 | 17.12 | 6.68 | 11.61 | 13.61 |
| 30 | 13.37 | 17.24 | 18.90 | 10.04 | 13.96 | 15.98 |
| 35 | 15.89 | 19.18 | 20.88 | 13.13 | 16.42 | 18.39 |
| 40 | 18.43 | 21.26 | 22.98 | 16.07 | 18.89 | 20.82 |
| 45 | 20.96 | 23.43 | 25.16 | 18.92 | 21.37 | 23.26 |
| 50 | 23.51 | 25.68 | 27.41 | 21.69 | 23.85 | 25.72 |

FIG. 19

( degree )

| Angles of forward vehicle with respect to own vehicle | Angles | | Open angle | Basic value (20L) | | Basic value (20R) | |
|---|---|---|---|---|---|---|---|
| ω | θ2 | θ1 | λ | β2 | β1 | α2 | α1 |
| 5 | -17.42 | 18.29 | 35.71 | -17.42 | 46.86 | -45.99 | 18.29 |
| 10 | -2.69 | 9.47 | 12.16 | -2.69 | 19.20 | -12.42 | 9.47 |
| 15 | 2.39 | 9.66 | 7.27 | 2.39 | 15.48 | -3.43 | 9.66 |
| 20 | 6.00 | 11.17 | 5.17 | 6.00 | 15.91 | 1.86 | 11.17 |
| 25 | 9.12 | 13.11 | 3.99 | 9.12 | 16.30 | 5.93 | 13.11 |
| 30 | 12.02 | 15.26 | 3.24 | 12.02 | 17.85 | 9.48 | 15.26 |
| 35 | 14.80 | 17.51 | 2.71 | 14.80 | 19.82 | 12.53 | 17.51 |
| 40 | 17.51 | 19.83 | 2.32 | 17.51 | 21.89 | 15.55 | 19.83 |
| 45 | 20.17 | 22.19 | 2.02 | 20.17 | 23.91 | 18.55 | 22.19 |
| 50 | 22.79 | 24.58 | 1.79 | 22.79 | 26.01 | 21.36 | 24.58 |

FIG. 20

| Angles of forward vehicle with respect to own vehicle | Angles (20L) | | Angles (20R) | | (degree) |
|---|---|---|---|---|
| ω | η2 | η1 | ξ2 | ξ1 |
| 5 | -17.42 | 46.85 | -45.99 | 18.29 |
| 10 | -2.69 | 19.20 | -12.42 | 9.47 |
| 15 | 2.39 | 16.00 | -3.43 | 10.07 |
| 20 | 6.00 | 16.40 | 1.86 | 11.97 |
| 25 | 9.12 | 17.65 | 5.93 | 14.11 |
| 30 | 12.02 | 19.33 | 9.43 | 16.39 |
| 35 | 14.80 | 21.23 | 12.63 | 18.73 |
| 40 | 17.51 | 23.28 | 15.65 | 21.12 |
| 45 | 20.17 | 25.43 | 18.55 | 23.52 |
| 50 | 22.79 | 27.64 | 21.36 | 25.95 |

HEADLIGHT CONTROLLER, OPTICAL UNIT AND VEHICLE HEADLIGHT

This application claims the priority benefit under 35 U.S.C. §119 of Japanese Patent Application No. 2012-051879 filed on Mar. 8, 2012 and Japanese Patent Application No. 2012-051977 filed on Mar. 8, 2012, both of which are hereby incorporated in their entireties by reference.

BACKGROUND

1. Field

The presently disclosed subject matter relates to headlight controllers, optical units and vehicle headlights, and more particularly to vehicle headlights including the headlight controller and the optical unit, which do not include a movable component with a simple structure, and a vehicle headlight having a favorable light distribution pattern that can be easy to drive at night, while preventing the optical unit from emitting a glare-type light to oncoming vehicles and vehicles moving forward on a driving lane in response to various traffic conditions.

2. Description of the Related Art

When drivers steer a car at night, the drivers usually want to steer the car while they turn on headlights for a high beam to improve a visibility. However, drivers must drive the car while they switch between the headlights for a high beam and headlights for a low beam in response to various traffic conditions so that the headlights do not give a glare type light to oncoming vehicles, vehicles moving forward on a same driving lane, etc.

Hence, vehicle headlights including an adaptive driving beam (ADB) have been developed. A vehicle headlight including an ADB, for example, may contribute an improvement of visibility in a forward direction of the vehicle that has the ADB for a driver by detecting an oncoming vehicle, a forward vehicle and the like with a camera incorporated into the vehicle that has the ADB and by emitting a high beam for the driver on an area except regions where the oncoming vehicle and the forward vehicle move.

A first conventional headlight controller for an ADB is disclosed in Patent Document No. 1 (Japanese Patent Application Laid Open JP 2011-31807). FIGS. 23a to 23f are schematic light distribution patterns depicting light distributions with respect to horizontal line H and vertical line V, which may be formed by the first conventional headlight controller used in countries where drivers keep to the left side of the road. FIG. 23a shows a light distribution pattern Lo for a low beam, which may prevent emission of a glare type light to an oncoming vehicle moving on the right side of the road. FIG. 23b shows a light distribution pattern Hi for a high beam, which may emit light toward an innermost region in a forward direction of the vehicle using the headlight controller.

FIG. 23c shows a light distribution pattern LHi for a left half high beam, in which the headlight controller combines a left half high beam distribution pattern formed by a left headlight with a low beam distribution pattern formed by a right headlight. This light distribution pattern LHi may be useful where vehicles moving forward on the same driving lanedo not exist and an oncoming vehicle approaches the vehicle on an oncoming lane. FIG. 23d shows a light distribution pattern RHi for a right half high beam, in which the headlight controller combines a right half high beam distribution pattern formed by the right headlight with a low beam distribution pattern formed by the left headlight. The light distribution pattern RHi may be useful where vehicles do not exist on the oncoming lane and a vehicle moves forward on the same driving lane.

FIG. 23e shows a light distribution pattern V to inhibit light close to an intersection of horizontal line H and vertical line V, in which the headlight controller combines a low beam distribution pattern formed by the left headlight with a low beam distribution pattern, which is symmetric with respect to the vertical line V of the low beam distribution pattern of the left headlight, formed by the right headlight. The light distribution pattern V may allow ease of recognition of an obstacle close to either road shoulders while preventing a glare-type light from being emitted to a faraway vehicle.

FIG. 23f shows a split light distribution pattern S, in which the headlight controller combines a left half high beam distribution pattern swiveled leftward by the left headlight with a right half high beam distribution pattern swiveled rightward by the right headlight. The light distribution pattern S may improve visibilities out of the driving lane and the oncoming lane while preventing the left and right headlight from emitting a glare type light to an oncoming vehicle and a vehicle moving on the same driving lane.

FIG. 24 is a block diagram showing the first conventional headlight controller for the ADB, which is described with reference to FIGS. 23a to 23f, and a second conventional headlight controller, which adds a dotted line region into the block diagram of the first conventional headlight controller shown in FIG. 24 as described later. The above-described right and left headlight 210 includes: a bulb 14 emitting light in a direction toward a light-emission of the headlight 210; a leveling actuator 226 moving the bulb 14 in a vertical direction toward the light-emission of the headlight 210; a swivel actuator 222 moving the bulb 14 in a horizontal direction toward the light-emission of the headlight 210; a shade motor 221 rotating a revolution shade that shades the light emitted from the bulb 14; a driving circuit 230 turning on the bulb 14; and a lighting controller 228 controlling the driving circuit 230, the leveling actuator 226, the swivel actuator 222 and the shade motor 221, and thereby forming the above-described light distribution patterns.

The first conventional headlight system 100 including the right and left headlight 210 further includes: a light switch 304 selecting either manual mode or ADB mode that forms the above-described light distribution patterns based upon traffic conditions; a camera 306 detecting the traffic conditions such as an oncoming vehicle, a vehicle moving forward on a driving lane and the like, and outputting such data to a vehicle controller 302; a steering sensor 308 detecting a wheeling angle of the subject vehicle, and outputting data of the wheeling angle to the vehicle controller 302; a speed sensor 310 detecting a traveling speed of the subject vehicle, and outputting the traveling speed data to the vehicle controller 302; and a navigation system 312 obtaining road information and the like, and outputting such data to the vehicle controller 302; and the vehicle controller 302 providing the lighting controller 228 in the headlight 210 with information for forming the light distribution patterns to in accordance with the above-described various data, as the headlight controller.

In the first conventional headlight system 100, when a vehicle using the headlight system 100 inclines in a longitudinal direction thereof, because a sight of the camera 306 incorporated into the vehicle varies, locating information of the traffic conditions such as an oncoming vehicle, a vehicle moving forward on its driving lane and the like, which are photographed by the camera 306, may also vary. Accordingly, when the vehicle inclines in the longitudinal direction thereof due to an uphill, an downhill and the like, the first conventional headlight system 100 may not prevent the headlight 210 from emitting a glare type light to the oncoming vehicle, the vehicle moving in a forward direction of the light emitting vehicle, etc.

Hence, a second conventional headlight system, which adds the dotted line region into the block diagram of the first conventional headlight system 100 shown in FIG. 24, is disclosed in Patent Document No. 2 (Japanese Patent Application Laid Open JP 2011-31808). The second conventional headlight system further includes: an inclined angle sensor 316 detecting an inclined angle of the subject vehicle with respect to the horizontal line H; a vehicle height sensor 314 detecting a pitch angle of the subject vehicle; a memory 318 storing data for the camera 306 such as a distortion of a lens, etc; and thereby the vehicle controller 302 calculating a correction data, so that the headlight system can form the light distribution patterns such that prevent the headlight from emitting a glare type light to oncoming vehicles, vehicles travelling in the forward direction of the subject vehicle and the like, even when the subject vehicle inclines.

Therefore, the second conventional headlight system may prevent the headlight 210 from emitting a glare type light to an oncoming vehicle, a vehicle moving in the forward direction of the subject vehicle and the like, even when the subject vehicle inclines in a longitudinal direction thereof due to the downhill, etc. However, an illuminating area where the headlight 210 may prevent giving a glare type light to the oncoming vehicle, the vehicle moving in the forward direction of the subject vehicle and the like, may vary each in cases that the vehicle takes a straight line, takes a right turn, takes a left turn, etc.

In addition, when a vehicle moving in the forward direction of a subject vehicle changes lanes, when the vehicle moving in the forward direction of the subject vehicle moves in a horizontal direction of the subject vehicle, and the like, the illuminating area where the headlight 210 may prevent giving a glare type light to the oncoming vehicle and the like, may vary from a case where the subject vehicle takes a straight line along with the vehicle moving forward on a same driving lane. That is because the oncoming vehicle and the vehicle moving forward on the same driving lane may frequently change in the horizontal direction of the subject vehicle using the headlight 210.

Moreover, the conventional headlight 210 includes movable parts such as the leveling actuator 226, the swivel actuator 222, the revolution shade rotated by the shading motor 221 and the like, and therefore may be subject to a complex structure. Furthermore, it may be very difficult to reduce a size of the headlight 210 because of the movable parts, and also may be difficult to design headlights having an attractive outside appearance such that matches various vehicular designs because the movable parts may limit a possibility of headlight design.

The above-referenced Patent Documents and additional Patent Documents are listed below and are hereby incorporated with their English abstracts and specification in their entireties.

1. Patent Document No. 1: Japanese Patent Application Laid Open JP 2011-31807
2. Patent Document No. 2: Japanese Patent Application Laid Open JP 2011-31808
3. Patent Document No. 3: U.S. patent application Ser. No. 13/229,663
4. Patent Document No. 4: U.S. patent application Ser. No. 12/720,819
5. Patent Document No. 5: U.S. patent application Ser. No. 13/083,522
6. Patent Document No. 6: Japanese Patent Application Laid Open JP 2011-221371

The disclosed subject matter has been devised to consider the above and other problems, characteristics and features. Thus, exemplary embodiments of the disclosed subject matter can include headlight controllers which can provide a favorable light distribution pattern to safely drive at night in accordance with various traffic conditions, while preventing a right and left headlight from giving a glare type light to oncoming vehicles and vehicles moving in a forward direction of a subject vehicle, even when the vehicle moving in the forward direction of the subject vehicle changes lanes, and even when the vehicle moving in the forward direction of the subject vehicle moves in a horizontal direction of the subject vehicle.

In addition, exemplary embodiments of the disclosed subject matter can include optical units with a simple structure, which can be used as the right and left headlight for the above-described headlight controller. The optical units do not include movable parts such as the conventional headlight, and therefore can expand possibilities for design so as to be able to harmonize with various vehicular designs.

SUMMARY

The presently disclosed subject matter has been devised in view of the above and other characteristics, desires, and problems in the conventional art. One of aspects of the disclosed subject matter can include headlight controllers that can output light distribution data to provide a favorable light distribution pattern to safely drive at night in accordance with various traffic conditions. The headlight controller can prevent a right and left headlight from giving a glare type light to oncoming vehicles and vehicles moving forward on a driving lane of a subject vehicle under the various traffic conditions. Another of the aspects of the disclosed subject matter can include providing optical units, which can be used as a right and left headlight having a high reliability for the headlight controller, and which can be easy to reduce a size of the headlight due to no movable part. Another aspect of the disclosed subject matter can include vehicle headlights using the headlight controller and the optical units, which can provide a favorable light distribution pattern that can be easy to drive at night for not only the subject vehicle but also vehicles traveling near the subject vehicle by utilizing the characteristics of the headlight controller and the optical unit.

According to one of aspects of the disclosed subject matter, a headlight controller can include a camera located adjacent a subject vehicle and configured to photograph at least one vehicle located in a forward direction of the subject vehicle, and a memory storing at least each feature extraction point of a first point, a second point (e.g., a right and left headlight of an oncoming vehicle and a right and left rear lamp of a vehicle moving forward in the forward direction of the subject vehicle) and a third point of the at least one vehicle, a first setup value having a positive and negative value for detecting a traveling condition of the subject vehicle and a second setup value for detecting a distance between the subject vehicle and the vehicle.

In addition, the headlight controller can also include a system controller configured to receive at least a vehicle speed signal and a steering angle from the subject vehicle, a vehicle detector therein configured to judge existence or non-existence of the vehicle included in image data output from the camera, configured to store a first flag signal (E) for informing the existence or non-existence of the vehicle, configured to detect a first angle ($\theta 1$) and a second angle ($\theta 2$) of two imaginary lines connecting the camera to each of the first point and the second point of the vehicle with respect to an optical axis of the camera when the first flag signal (E) shows the existence of the vehicle, respectively, and being configured to calculate a basic value in accordance with the first angle ($\theta 1$) and the second angle ($\theta 1$), a circling detector therein configured to calculate a turning radius (R) of the subject vehicle by using at least the vehicle speed signal and the steering angle, configured to compare the turning radius (R) with the first setup value, configured to store a second flag signal (C) for informing the traveling condition of the subject vehicle, configured to detect a third angle ($\gamma$in) and a fourth angle ($\gamma$out) of two imaginary lines connecting each of the right and left headlight to the third point of the vehicle with respect to the optical axis of the camera and being configured to calculate a second basic value in accordance with the turning radius (R), the third angle ($\gamma$in) and the fourth angle ($\gamma$out), a vehicle movement detector therein configured to detect movements including a relative moving angle in a rightward and leftward direction of the vehicle with respect to the subject vehicle when judging the existence of the vehicle in accordance with the first flag signal (E), configured to store a third flag signal (F) for informing said moving conditions and being configured to calculate a revised value based upon the relative moving angle, a distance detector therein configured to compare at least one of the first angle ($\theta 1$) and the second angle ($\theta 2$) with the second setup value for detecting whether a distance between the subject vehicle and the vehicle is shorter than a setup distance or not, and being configured to store said compared result as a fourth flag signal (K), a shading area controller therein configured to calculate boundary data between a shading area and an illuminating area of the right and left headlight in accordance with at least one of the basic vale, the second basic value and the revised value in view of at least of the first flag signal, the second flag signal (C), the third flag signal (F) and the fourth flag signal (K), and a light distribution controller therein configured to output light distribution data in accordance with the boundary data output.

In the above-described exemplary headlight controllers, when each of the first point and the second point of the vehicle is a respective one of the right and left rear lamp, each of feature extraction points of the first point and the second point can be usually light with a substantially same brightness at night, and when each of the first point and the second point of the vehicle is a respective one of the right and left headlight, each of feature extraction points of the first point and the second point can also be usually light with a substantially same brightness at night. The third point of the vehicle can be at least one of a door miller and a front edge in a turning direction of the vehicle and the feature extraction point of the vehicle can be an end in the turning direction of the vehicle in view from the own vehicle. Additionally, the second flag signal (C) for informing the traveling condition of the subject vehicle can include at least three signals of turning a right, turning a left and taking a straight line, and the revised value can be configured with a quadratic function of the relative moving angle of the vehicle with respect to the own vehicle. The third flag signal (F) for informing the moving conditions of the vehicle can include at least five signals of big move rightward, small move rightward, no change, big move leftward and small move leftward.

According to another aspect of the disclosed subject matter, an optical unit can include: a mounting board; a first plurality of white LEDs each emitting white light including a first central light, and mounted on a mounting surface of the mounting board; a second plurality of white LEDs each emitting white light including a second central light, being mounted on the mounting surface of the mounting board and being aligned in a substantially parallel with the first white LEDs; a light-interfering frame having an plurality of openings and a plurality of optical lens each being located in a respective one of the openings, being located adjacent the first and the second white LEDs so that each of the optical lens covers a respective one of the first and the second white LEDs.

Moreover, the optical unit can also include a lens holder formed in a tubular shape and surrounding the first and the second white LEDs and the light-interfering frame, and a projector lens having at least one focus located on an optical axis thereof and an imaginary surface intersecting with the optical axis and also intersecting with the mounting board between the first and the second white LEDs in a linear fashion, and located adjacent an opening of the lens holder, the optical axis extending between the substantially first central light and the substantially second central light, the focus located between the mounting board and the light-interfering frame, and thereby each of the first and the second white LEDs being configured to emit light separately with respect to the imaginary surface from a light-emitting surface having a curvature, respectively, wherein each of the first white LEDs and each of the second white LEDs are configured to emit beam lights each having a light-emitting angle in a substantially parallel direction with the imaginary surface from the light-emitting surface of the projector lens, respectively.

In this case, so that the optical unit can provide various favorable light distribution patterns in accordance with the light distribution data output from the headlight controller, a light-emitting angle of a beam light corresponding to the first central light emitted from the light-emitting surface can be inclined in parallel with the substantially imaginary surface with respect to the optical axis of the projector lens in an opposite direction of one of both front sides of the subject vehicle, lighting angles of adjacent beam lights can increase in an outward direction of the light-emitting surface from beam lights adjacent a beam light corresponding to the first central light in beam lights corresponding to the first white LEDs emitted from the light-emitting surface of the projector lens, the light-emitting angle of the beam light corresponding to the first central light can also be smaller than a light-emitting angle of a beam light corresponding to the second central light, and also the number of the first white LEDs can be larger than that of the second white LEDs.

According to another aspect of the disclosed subject matter, a vehicle headlight can include: one of the headlight controllers described above; two of the above-described optical units; at least one LED drive circuit configured to turn on individually each of the first and the second white LEDs; and at least one output controller configured to control the at least one LED drive circuit in accordance with the light distribution data output from the headlight controller. The headlight controller can provide a favorable light distribution pattern for the optical units to safely drive at night in accordance with various traffic conditions, while preventing the optical units giving a glare type light to oncoming vehicles and vehicles moving forward on a driving lane of the own vehicle under the various traffic conditions.

Thus, the disclosed subject matter can also provide vehicle headlights using the headlight controller and the optical units that can be used as the right and left headlight having a high reliability with a simple structure without a movable part, which can provide a favorable light distribution pattern that can be easy to drive at night for the own vehicle and other vehicles traveling near the own vehicle by utilizing the characteristics of the headlight controller and the optical unit.

BRIEF DESCRIPTION OF THE DRAWINGS

These and other characteristics and features of the disclosed subject matter will become clear from the following description with reference to the accompanying drawings, wherein:

FIGS. 3a and 3b are schematic top/front views depicting Comparative embodiment 1 and Exemplary embodiment 1 of light distribution patterns projected from the optical unit when a subject vehicle using the vehicle headlight of FIG. 1 takes a right turn, respectively;

FIGS. 4a and 4b are schematic top/front views depicting Comparative embodiment 2 and Exemplary embodiment 2 of light distribution patterns projected from the optical unit when a forward vehicle moves rightward on a same driving lane as the subject vehicle using the vehicle headlight of FIG. 1, respectively;

FIG. 5b is a top view depicting exemplary light-emitting angles of beam lights emitted from the light source unit of FIG. 5a;

FIG. 8a is an explanatory top view showing an exemplary detecting method for detecting a vehicle moving forward on a same driving lane as the subject vehicle using the vehicle headlight of FIG. 1, and FIG. 8b is an explanatory top view showing an exemplary estimating method for determining a shading area of the optical unit 20R and 20L when the subject vehicle take a straight line;

FIG. 9a is an explanatory top view showing an exemplary forward vehicle moving forward on the same driving lane as the subject vehicle using the headlight of FIG. 1, and FIG. 9b is an explanatory top view showing an exemplary estimating method for determining a right boundary of the shading area for the optical unit 20R and 20L when the subject vehicle takes a right turn;

FIG. 11 is a table showing an exemplary comparison between a basic value and total values adding a revised value into the basic values in the vehicle headlight made in accordance with principles of the disclosed subject matter;

FIG. 12 is a table showing an exemplary basic estimation algorithm of the vehicle headlight made in accordance with principles of the disclosed subject matter;

FIG. 18 is a table showing angles of Parameters shown in FIGS. 17a and 17b at each of angles ω of the forward vehicle with respect to the subject vehicle;

FIG. 19 is a table showing an exemplary evaluation result based on the basic value for the optical unit 20R and 20L at each of the angles ω of the forward vehicle with respect to the subject vehicle;

FIG. 20 is a table showing an exemplary evaluation result for the optical unit 20R and 20L at each of the angles ω of the forward vehicle in accordance with the algorithm of the disclosed subject matter;

DETAILED DESCRIPTION OF EXEMPLARY EMBODIMENTS

Figure 1:
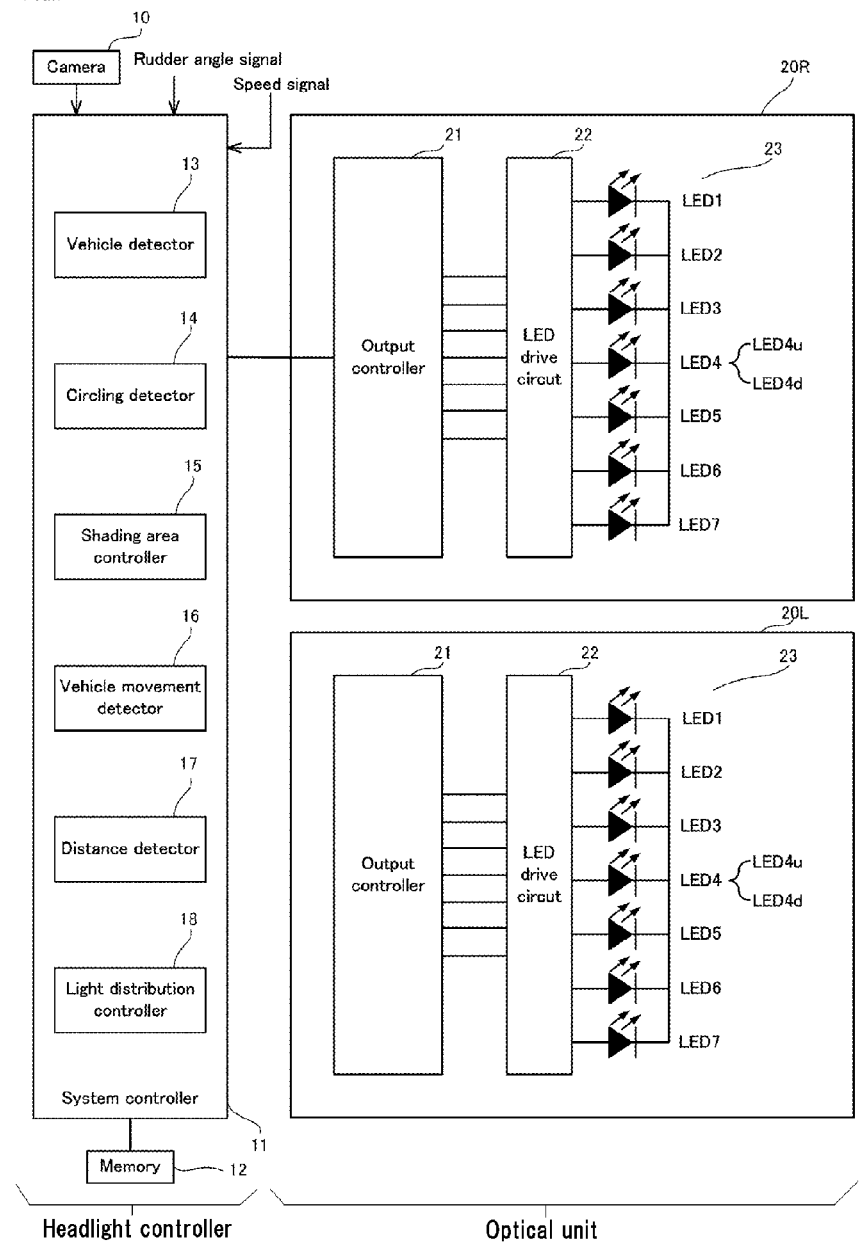
FIG. 1 is a block diagram showing an exemplary embodiment of a vehicle headlight including a headlight controller and an optical unit made in accordance with principles of the disclosed subject matter.

The disclosed subject matter will now be described in detail with reference to FIG. 1 to FIG. 22. FIG. 1 is a block diagram showing an exemplary embodiment of a vehicle headlight including a headlight controller and an optical unit made in accordance with principles of the disclosed subject matter.

1. System Structure and Features of the Disclosed Subject Matter

The vehicle headlight can include the headlight controller and the optical unit 20R and 20L, which can be used as a right and left headlight for the subject vehicle incorporating the headlight controller. The headlight controller can include: a camera 10 located at a predetermined position in a forward direction of the own vehicle (e.g., close to a vehicle interior mirror), photographing an objective space in the forward direction of the own vehicle, configured to photograph at least one vehicle located in the forward direction of the own vehicle, and the camera 10 configured to output the at least one vehicle photographed by the camera 10 as image data; a system controller 11 configured to receive the image data output from the camera 10 and configured to receive at least a vehicle speed signal and a steering angle from Speed signal and Rudder angle signal of the subject vehicle, respectively; and a memory 12 storing data output from the system controller 11, setup data, etc.

The system controller 11 can include a vehicle detector 13 configured to judge existence or non-existence of a vehicle included in the image data output from the camera 10 and configured to calculate location data of the vehicle when judging the existence of the vehicle; a circling detector 14 configured to calculate a turning radius of the own vehicle and configured to calculate each of angles of two imaginary lines connecting each of the optical unit 20R and 20L to an end (e.g., door miller) in a turning direction of the vehicle with respect to an optical axis of the camera 10; a vehicle movement detector 16 configured to detect movements of the vehicle with respect to the own vehicle and configured to calculate a revised value in accordance with the movements; a distance detector 17 configured to detect whether a distance between the subject vehicle and the other vehicle is shorter than a setup distance or not; a shading area controller 15 configured to estimate boundary data between a shading area and an illuminating area for the optical unit 20R and 20L in accordance with at least the above-described information so as to prevent the optical unit 20R and 20L from emitting a glare type light to the vehicles located in the forward direction of the own vehicle; and a light distribution controller 18 configured to control the optical unit 20R and 20L in accordance with the boundary data output from the shading area controller 15 in order for the optical unit 20R and 20L to be able to provide a favorable light distribution pattern also to a driver of the subject vehicle.

The optical unit 20R can be attached to a front right portion of the subject vehicle as the right headlight, and also the optical unit 20L can be attached to a front left portion of the subject vehicle as the left headlight. The optical unit 20R and 20L can include an output controller 21 configured to receive light distribution data output from the light distribution controller 18 of the system controller 11; an LED drive circuit 22 configured to receive an LED driving signal output from the output controller 21; and a light source unit 23 including LED1 to LED7 each emitting light having a substantially white color tone so as to provide the favorable light distribution pattern in accordance with the LED driving signal, which is output from the LED driving circuit 22. As LED1 to LED7, a semiconductor light-emitting device such that is disclosed in Patent Document No. 3 can be used.

Figure 2:
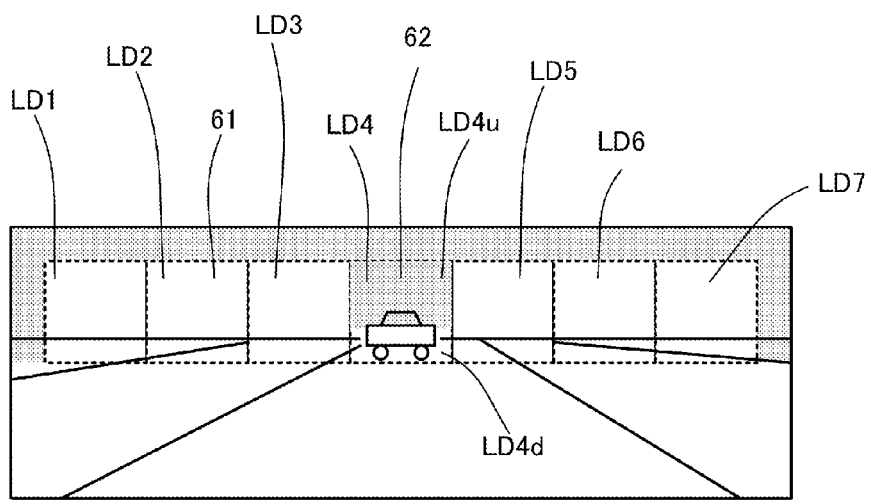
FIG. 2 is a schematic pattern diagram showing an exemplary light distribution pattern projected by the vehicle headlight shown in FIG. 1, wherein mark 61 shown by white color is an illuminating area, and mark 62 shown by light gray color is a shading area.

Here, in order to facilitate an understanding of the vehicle headlight of the disclosed subject matter, exemplary light distribution patterns projected from the headlight will now be described with reference to FIG. 2 to FIG. 4b. FIG. 2 is a schematic pattern diagram showing an exemplary light distribution pattern projected by the vehicle headlight shown in FIG. 1, in which mark 61 shown by white color is an illuminating area, and mark 62 shown by light gray color is a shading area.

In this case, the illuminating area 61 can be composed of areas LD1 to LD3, LD4d and LD5 to LD7, which are substantially projected from each of LED 1 to LED 7 of the optical unit 20R and 20L, respectively, and the shading area 62 can be composed of area LD4u. Each of LED 1 to LED 7 can include a plurality of white light-emitting devices (white LEDs), in which at least one white LED (e.g., LED4d shown in FIG. 1) emits a downward beam light (e.g. at LD4d) such that is used as a low beam, and at least another white LED (e.g., LED4u shown in FIG. 1) emits an upward beam light (e.g. at LD4u) such that is used as a high beam.

Accordingly, the light distribution pattern including the illuminating area 61 and the shading area 62 shown in FIG. 2 can be formed by turn on LED1 to LED3, LED4d and LED5 to LED7 and by turning off LED4u. More specifically, FIG. 2 shows a case where areas LD1 to LD3 and LD5 to LD7 form a light distribution pattern for a high beam and only area LD4 forms a light distribution pattern for a low beam, in which area LD4d in the illuminating area 61 is projected as a low beam by LED4d of LED4 in the optical unit 20R and 20L and area LD4u of the shading area 62 can be shaded by turning off LED4u of LED4.

In addition, each of LED1 to LED7 can change a light-intensity thereof by adjusting a respective driving current output from the LED drive circuit 22. Accordingly, a forward distance of the illuminating area LD4d can also be adjusted by varying a driving current of LED4d output from the drive circuit 22 in accordance with a distance between the own vehicle and the vehicle located in the forward direction of the subject vehicle. Moreover, each of LED 1 to LED7 can also include an additional white LED such that projects at least one of on a horizontal line, underneath the horizontal line, in the horizontal area, etc.

FIGS. 3a and 3b are schematic top/front views depicting Comparative embodiment 1 and Exemplary embodiment 1 of light distribution patterns projected from the optical unit 20R and 20L when the own vehicle using the vehicle headlight of FIG. 1 takes a right turn, respectively. A light distribution pattern of Comparative embodiment 1 shown in FIG. 3a may be formed by the vehicle headlight, which employs a calculating method for a case where the subject vehicle takes a straight line.

In this case, although the own vehicle takes a right turn, the headlight of the subject vehicle may form the shading area 62 having a relative narrow width in a direction toward a vehicle moving forward on a same driving lane as the subject vehicle. That is because the vehicle headlight may employ an algorithm for taking a straight line and therefore may estimate a width of the forward vehicle at a relative narrow width. Accordingly, the optical unit 20R and 20L of the subject vehicle may emit a glare type light to a right side of the forward vehicle including a driver seat by the illuminating area 61 having a relative wide area, as shown in FIG. 3a.

Meanwhile, a light distribution pattern of Exemplary embodiment 1 shown in FIG. 3b can be formed by the vehicle headlight, which employs a calculating method for a case where the own vehicle takes a right turn. The calculating method can employ an algorithm for taking a right turn and therefore can estimate the width of the forward vehicle at a relative wide width, because the calculating method is based upon a turning radius of the own vehicle. Thus, the disclosed subject matter can provide a vehicle headlight that can prevent the optical unit 20R and 20L from giving a glare type light to the forward vehicle including the driver seat, even when the subject vehicle takes a right turn, as shown in FIG. 3b.

FIGS. 4a and 4b are schematic top/front views depicting Comparative embodiment 2 and Exemplary embodiment 2 of light distribution patterns projected from the optical unit 20R and 20L when a forward vehicle moves rightward on a same driving lane as the subject vehicle using the vehicle headlight of FIG. 1, respectively. A light distribution pattern of Comparative embodiment 2 shown in FIG. 4a may be formed by the vehicle headlight, which employs a calculating method for a case where the own vehicle takes a straight line in common with the case shown in FIG. 3a.

In this case, although the forward vehicle moves rightward on the same driving lane as the subject vehicle, the optical unit 20R and 20L may form the shading area 62 having a relative narrow width in a direction toward the forward vehicle moving on the same driving lane as the subject vehicle. That is also because the vehicle headlight may employ the algorithm for taking a straight line and therefore may estimate a width of the forward vehicle at a relative narrow width. Accordingly, the optical unit 20R and 20L may giving a glare type light to a right side of the front vehicle including a driver seat by the illuminating area 61 having a relative wide area, as shown in FIG. 4a.

On the contrary, a light distribution pattern of Exemplary embodiment 2 can be formed by the vehicle headlight, which can employ a calculating method for a case where the forward vehicle moves rightward in response to the image data output from the camera 10. The calculating method can employ an algorithm including a moving direction of the forward vehicle, and therefore can revise a shape of the shading area 62, because the calculating method can be based upon a relative angle of the forward vehicle with respect to the subject vehicle. Thus, the disclosed subject matter can provide vehicle headlights that can prevent the optical unit 20R and 20L from emitting a glare type light to the forward vehicle including the driver seat, even when the forward vehicle suddenly moves rightward due to its lane change, furthermore while providing a favorable light distribution for a driver of the own vehicle, as shown in FIG. 4b.

The cases where the forward vehicle takes a right turn on the same driving lane as the subject vehicle and the forward vehicle moves rightwards, are mainly described above. When the forward vehicle is an oncoming vehicle approaching on an oncoming lane toward the subject vehicle, the disclosed subject matter can also employ a same and/or similar algorithm so as to prevent the optical unit 20R and 20L of the subject vehicle from emitting a glare type light to the oncoming vehicle.

Returning to FIG. 1, the exemplary system structure of the disclosed subject matter will be described in more detail. The system controller 11 can include a computer system include a central processing unit (CPU), a read-only memory (ROM), a random access memory (RAM) and the like, and can be operated as a controller for the headlight by running a program from the ROM while using the camera 10 and the memory 12. Functions of the memory 10 will now be described in more detail.

The memory 10 can be configured to store at least a distance value (2×P) between the right and left headlight (the optical unit 20R and 20L) of the subject vehicle, each feature extraction point of a first point, the second point (e.g., a right and left headlight of an oncoming vehicle and a right and left rear lamp of a vehicle moving forward in a forward direction of the subject vehicle) and the third point (e.g., a door miller in a turning direction of the vehicle moving forwards in the forward direction of the subject vehicle) of the vehicle, a first setup value having a positive (u) and negative value (−u) for detecting a traveling condition of the subject vehicle, that is whether the own vehicle takes a straight line, takes a right turn or takes a left turn, and a second setup value (z) for detecting a distance between the subject vehicle and the vehicle included in the image data output from the camera 10, and can be configured to store flag signals described later, etc.

The vehicle detector 13 can be configured to judge existence or non-existence of the at least one vehicle of various vehicles included in the image data output from the camera 10 in accordance with at least one of feature extraction points of the first point, the second point and the third point of the vehicle. In the case, when each of the first point and the second point of the vehicle is a respective one of the right and left rear lamp of the vehicle, each of the feature extraction points of the first point and the second point may be usually light with a substantially same brightness at night, and when the vehicle is an oncoming car and each of the first point and the second point thereof is a respective one of a right and left headlight, each of feature extraction points of the first point and the second point may also be usually light with a substantially same brightness at night.

In addition, the vehicle detector 13 can be configured to store a first flag signal (E) for informing the existence or non-existence of the vehicle, and can be configured to detect a first angle ($\theta1$) and a second angle ($\theta2$) of two imaginary lines connecting the camera 10 to each of the first point and the second point of the vehicle with respect to the optical axis of the camera 10 by using the image data output from the camera 10 when the first flag signal (E) shows the existence of the vehicle (E=1), respectively, and thereby can estimate an approximately angle between a width of the oncoming car in view from the camera 10 and also can estimate an approximately angle in a direction toward the oncoming car with reference to the optical axis of the camera 10.

Similarly, when the forward vehicle is a vehicle moving forward on a driving lane similar to the own vehicle, the vehicle detector 13 can detect an angle between the right and left tail lamp of the vehicle moving in the forward direction of the own vehicle in view from the camera 10, and thereby can estimate an approximately angle between a width of the vehicle moving forwards on the driving lane from the camera 10 and also can sequentially estimate an proximately angle in a moving direction of the vehicle with reference to the optical axis of the camera 10. Finally, the vehicle detector 13 can be to calculate a basic value in accordance with the first angle and the second angle, as described in detail later.

The circling detector 14 can be configured to calculate a turning radius (R) of the subject vehicle by using at least the vehicle speed signal and the steering angle output from the subject vehicle; compare the turning radius (R) of the subject vehicle with the first setup value having a positive (u) and negative value (−u); store a second flag signal (C) for informing the traveling condition of the subject vehicle, that is whether the subject vehicle takes a straight line, takes a right turn or takes a left turn; detect a third angle and a fourth angle of two imaginary lines connecting each of the optical unit 20R and 20L of the subject vehicle to the third point of the vehicle with respect to the optical axis of the camera 10 by using the image data output from the camera 10.

In this case, the third point of the vehicle can be an end such as a door miller, a front edge and the like in a turning direction of the vehicle to detect a boundary between the shading area 62 and the illuminating area 61 in the turning direction of the vehicle. Finally, the circling detector 14 can be configured to calculate a second basic value such that can employ the algorithm for taking a right and left turn, in accordance with the turning radius (R) of the subject vehicle, the third angle and the fourth angle.

The vehicle movement detector 16 can be configured to detect movements including a relative moving angle (σ) in a rightward and leftward direction of the vehicle with respect to the subject vehicle (in view from the subject vehicle by the camera 10) when judging the existence of the vehicle (E=1) in accordance with the first flag signal (E), and can be configured to store a third flag signal (F) for informing said moving conditions. Additionally, the vehicle movement detector 16 can be configured to calculate a revised value based upon the relative moving angle (σ), as described later.

The distance detector 17 can be configured to compare at least one of the first angle and the second angle detected by the vehicle detector 13 with the second setup value (z) stored in the memory 10 for detecting whether a distance between the subject vehicle and the vehicle is shorter than a setup distance or not, and also can be configured to store said compared result as a fourth flag signal (K).

The shading area controller 15 can determine the shading area of the optical unit 20R and 20L to prevent emission of a glare type light to the forward vehicles in accordance with the basic value, which are estimated by the vehicle detector 13 when the subject vehicle takes a straight line (a first process). On the other hand, when the subject vehicle takes a right turn or a left turn, the shading area controller 15 can determine the shading area of the optical unit 20R and 20L in accordance with the second basic value, which are estimated by the circling detector 14 (a second process). In this case, the shading area controller 15 can determine the shading area by alternating the first process and the second process in response to the second flag signal (C) output from the circling detector 14, which can detect whether the subject vehicle takes a straight line or takes a turn.

In addition, the shading area controller 15 can revise the shading area in accordance with the relative moving angle (σ) of the vehicle with respect to the subject vehicle, which is detected by the vehicle movement detector 16, so as to prevent the optical unit 20R and 20L from emitting a glare type light to the forward vehicles. In this case, the relative angle (σ) of the vehicle with respect to the subject vehicle can be estimated by the vehicle movement detector 16 by using the vehicle speed of the subject vehicle, which can be input from the speed signal of the own vehicle, and by using a change in angles in the rightward and leftward direction of the vehicle in view from the subject vehicle, which can be sequentially detected by the vehicle movement detector 16.

Moreover, when the distance detector 17 judges that the distance between the subject vehicle and the vehicle is shorter than the setup distance, the shading area controller 15 can determine the shading area shaded by the optical unit 20R and 20L in accordance with the fourth flag signal (K) of the distance detector 17 in common with the basic value calculated by the vehicle detector 13, in spite of a case where the subject vehicle takes a turn or not.

Therefore, the shading area controller 15 can be configured to calculate boundary data between the shading area 63 and the illuminating area 61 for the optical unit 20R and 20L of the vehicle headlight in accordance with at least one of the basic vale, the second basic value and the revised value in view of at least of the first flag signal (E), the second flag signal (C), the third flag signal (F) and the fourth flag signal (K).

The light distribution controller 18 can control the optical unit 20R and 20L in accordance with the boundary data, which are calculated by the shading area controller 15. The light distribution controller 18 can determine a favorable light distribution pattern based upon the boundary data, and then can output a control signal to the optical unit 20R and 20L so that the light source unit 23 of the optical unit 20R and 20L can form the favorable light distribution pattern.

Figure 5A:
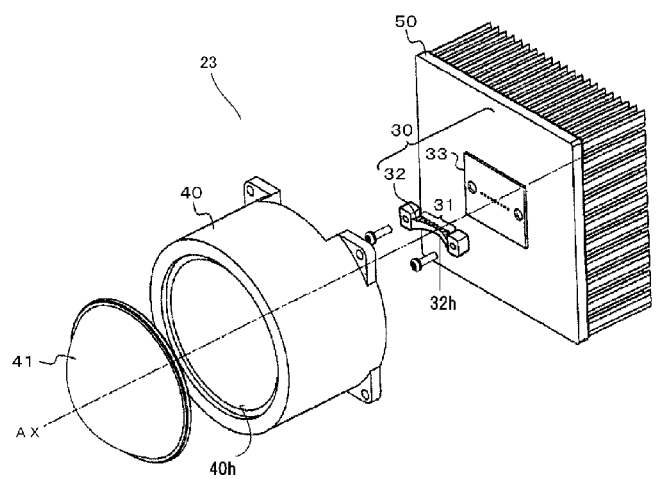
FIG. 5a is an enlarged exploded perspective view depicting an exemplary light source unit of the vehicle headlight shown in FIG. 1.
Figure 5B:
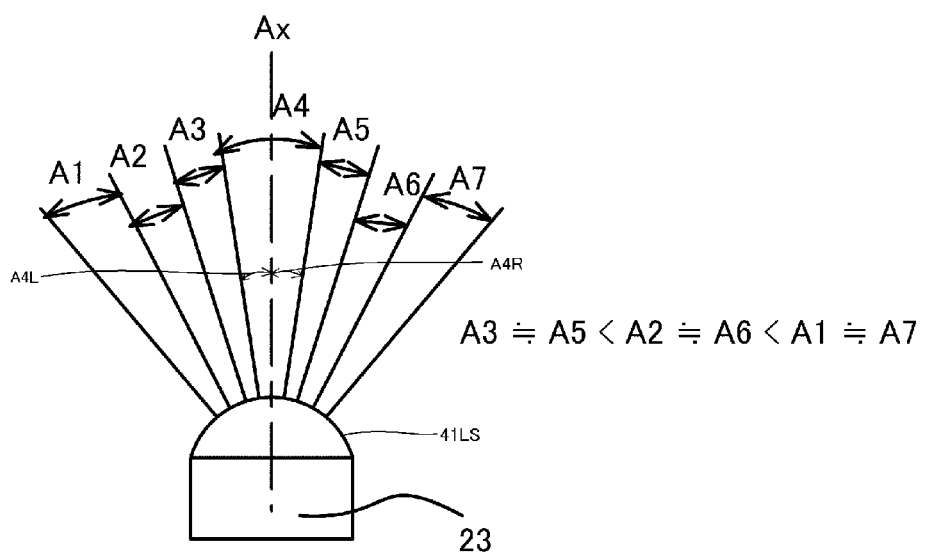
Figure 6:
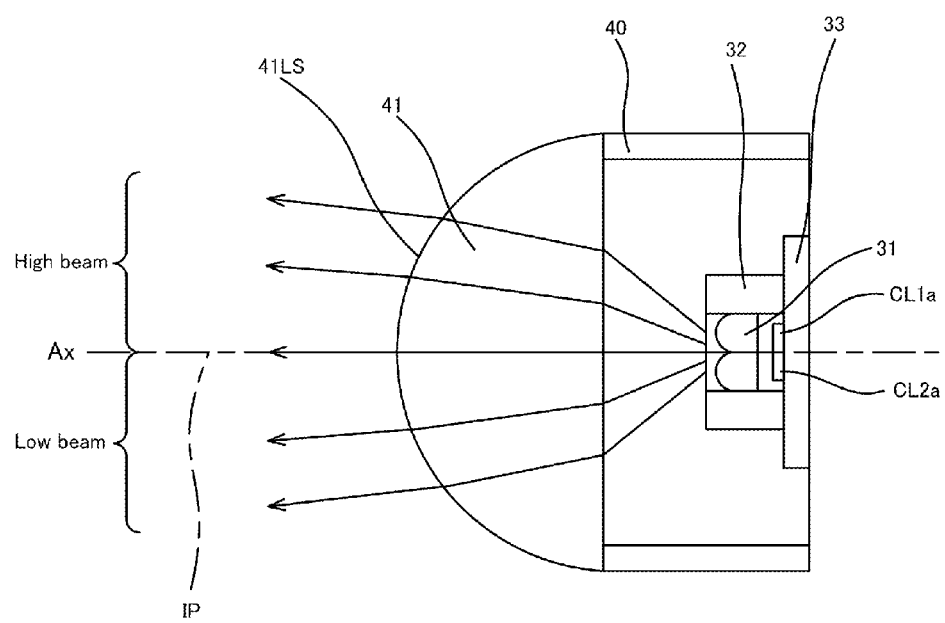
FIG. 6 is a cross-sectional view depicting the light source unit of FIG. 5a and the beam lights including a high beam and a low beam of FIG. 5b.

FIG. 5a is an enlarged exploded perspective view depicting an exemplary light source unit of the vehicle headlight shown in FIG. 1, FIG. 5b is a top view depicting exemplary light-emitting angles of beam lights emitted from the light source unit of FIG. 5a, and FIG. 6 is a cross-sectional view depicting the light source unit of FIG. 5a and the beam lights including a high beam and a low beam of FIG. 5b. The light source unit 23 of the optical unit 20R and 20L can include a heat sink 50; a light-emitting unit 30 including a light-interfering frame 32 having a plurality of optical lenses 31 and a plurality of openings 32h, and including a mounting board 33 mounting the LED1 to LED7 thereon, each of the optical lenses 31 located in a respective one of the openings 32h of the light-interfering frame 32, and the light-interfering frame 32 attached to the heat sink 50 along with the mounting board 33 via screws so that each of the LED1 to LED7 corresponds to the respect one of the openings 32h of the light-interfering frame 32 and associates with a respect one of the optical lenses 31; a lens holder 40 having a top opening 40h formed in a tubular shape, and attached to the heat sink 50 while surrounding the light-emitting unit 30 therewith; and a projector lens 41 having an optical axis AX and at least one focus located on the optical axis AX, and attached to the top opening 40h of the lens holder 40, the optical axis AX intersecting with the light-interfering frame 32 and intersecting with the mounting board 33 at a substantially right angle, and the focus of the projector lens 41 located within a range of the light-emitting unit 30.

Figure 7A:
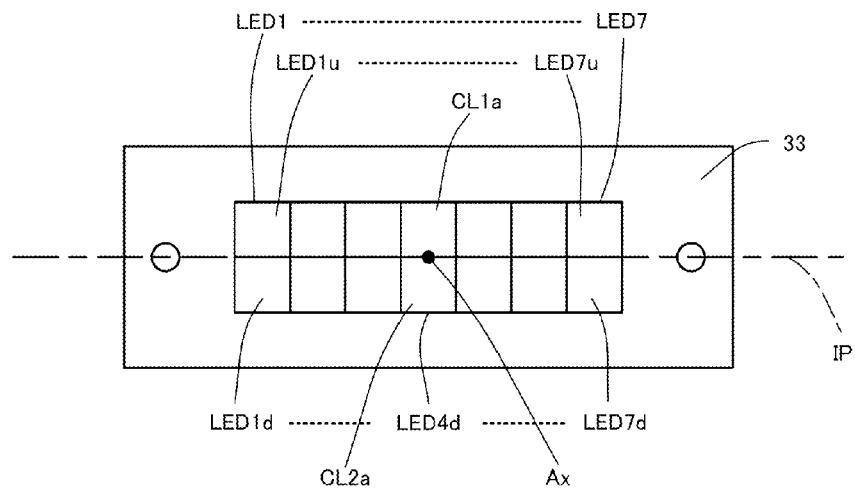
FIGS. 7a and 7b are front views showing a first and second exemplary location of a first and second plurality of white LEDs mounted on a light-emitting board of the light source unit shown in FIG. 5a and FIG. 6, respectively.

In this case, a first plurality of white LEDs (e.g., LED1u to LED7u) of the LED1 to LED7 shown in FIG. 1 can be mounted on the mounting board 33 of the light source unit 23 with a central focus on a first central light CL1a, and a second plurality of white LEDs (e.g., LED1d to LED7d) of the LED1 to LED7 can be mounted on the mounting board 33 with a central focus on a second central light CL2a so as to be aligned parallel to the first plurality of white LEDs, as shown in FIG. 7a. As a result, the first white LEDs can emit beam lights having light-emitting angles of A1 to A7 as a high beam via the light-interfering frame 32, the lens holder 40 and the projector lens 41, respectively, and the second white LEDs can also emit beam lights having the light-emitting angles of A1 to A7 as a low beam from an light-emitting surface 41LS of the optical unit 41, respectively, as shown in FIG. 5b.

In these cases, the high beam can be emitted from an upper portion of the light-emitting surface 41LS of an imaginary surface IP, which intersects with the optical axis Ax and also intersects with the mounting board 33 between the first white LEDs and the second white LEDs in a linear fashion as shown in FIG. 7a, and also the low beam can be emitted from a lower portion of the light-emitting surface 41LS of the imaginary surface IP, as shown FIG. 6.

Additionally, in order for the light source unit 23 to form a favorable light distribution pattern in accordance with the control signal output from the system controller 11, the light-emitting angles of A3 and A5, A2 and A6, and A1 and A7 can be nearly equal, respectively, and can be smaller in order of the above description, as shown in FIG. 5b. Accordingly, a curvature of the light-emitting surface 41L of the projector lens 41 can increases in an outward direction of the projector lens 41 in parallel with the imaginary surface IP, as disclosed Patent Document No. 4. A light-emitting angle of A4 located across the optical axis Ax will be described later.

Each of the light-emitting angles of A1 to A7 may not be overlapped as shown in FIG. 5b. However, the adjacent light-emitting angles of the light beams used as the low beam and as the high beam can also be overlapped with respect to each other. Even in the case where at least one of the beam lights includes the overlapped light-emitting structure, the vehicle headlight of the disclosed subject matter can also form a favorable light distribution pattern as shown in FIG. 3b and FIG. 4b.

Figure 7B:
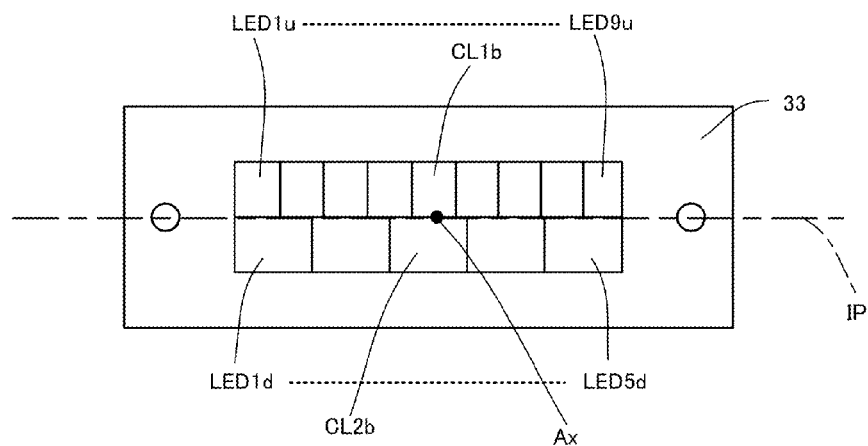

FIG. 7b is a front view showing a second exemplary location of the first and the second plurality of white LEDs mounted on the mounting board 33 of the light source unit 23 shown in FIG. 5a and FIG. 6. Each of the LEDs 1 to 7 can include the first and the second plurality of the white LEDs so that the first and the second plurality of white LEDs are arranged in a matrix and so that the vehicle headlight can provide the light distribution pattern such that each light-emitting angle of the beam lights for a high beam is the same as that of a low beam in a vertical direction, as shown in FIG. 2.

However, the LED1d to LED7d, which may be used as a low beam, may be usually rare to repeat turning on and off, and the LED1u to LED7u, which may be used as a high beam, may be heavy to repeat turning on and off as compared with the LED1d to LED7d. Additionally, it may be desirable for the vehicle headlight to repeat turning on and off at a detailed angle in accordance with the control signal output from the system controller 11.

Therefore, the number of the LEDs used as a low beam can increase compared to the number of the LEDs used as a high beam, as shown in FIG. 7b, and thereby each of light-emitting angles of the LEDs (e.g., LED1u to LED9u) used as a high beam can be narrower than that of the LEDs (e.g., LED1d to LED5d) used as a low beam so as to be able to form a detailed favorable light distribution pattern in accordance with the control data output from the system controller 11. Additionally, as the light source unit 23, a vehicle headlight using a semiconductor light source and a mirror, which can provide various light distribution patterns disclosed in Patent Document No. 5, can also be used.

2. Basic Control for Taking a Straight Line and Taking a Turn in Accordance with the Disclosed Subject Matter Algorithms for calculating boundaries between a shading area and illuminating areas when the subject vehicle takes a straight line and takes a turn will now be described with reference to FIG. 8a to FIG. 9b. FIG. 8a is an explanatory top view showing an exemplary detecting method for detecting a vehicle Fv moving forward on a same driving lane as the own vehicle Ov using the vehicle headlight of FIG. 1, and FIG. 8b is an explanatory top view showing an exemplary estimating method for determining the shading area of the optical unit 20R and 20L when the own vehicle Ov takes a straight line.

The headlight can detect a rear lamp of the forward vehicle Fv from the image data photographed by the camera 10, and can detect a first angle ($\theta 1$) of the right rear lamp and a second angle $-(\theta 2)$ of the left rear lamp with respect to the optical axis Ox of the camera 10. In this case, the first angle $\theta 1$ in a clockwise direction with respect to the optical axis Ox of the camera 10 is defined as a positive angle, and the second angle ($\theta 2$) in a counterclockwise direction with respect to the optical axis Ox of the camera 10 is defined as a negative angle. Exemplary boundaries between the shading area and the illuminating areas of the optical unit 20R and 20L can be estimated as follows by using the first angle ($\theta 1$) and the second angle ($\theta 2$). A right boundary angle between the shading and the illuminating areas of the unit 20R: $\alpha 1 = \theta 1$ ($\alpha 1$ is a right boundary angle with respect to the optical axis Ax of the optical unit 20R) A left boundary angle between the shading and the illuminating areas of the unit 20L: $\beta 2 = \theta 2$ ($\beta 2$ is a left boundary angle with respect to the optical axis Ax of the optical unit 20L) A left boundary angle between the shading and the illuminating areas of the optical unit 20R:

$$\alpha 2 = \theta 2 - 0.8 \times \lambda$$

A right boundary angle between the shading and the illuminating areas of the optical unit 20L:

$$\beta 1 = \theta 1 + 0.8 \times \lambda,$$

wherein $\lambda$ is an open angle, and $\lambda = \theta 1 - \theta 2$

A coefficient of 0.8 with respect to the open angle $\lambda$ is an exemplary coefficient, and therefore the coefficient can be a particular value. For example, when the camera can detect a distance between a right and left door miller as a relative longer distance than usually, the coefficient of 0.8 can vary as a larger coefficient than 0.8 so as to prevent from emitting a glare type light to the door miller. When the camera 10 can detect both rear edges of the front vehicle body under a circumstance having a brightness such that the rear lamp thereof is unnecessary to be turned on, the coefficient may be smaller than 0.8 so as to enlarge the illumining area for a driver of the subject vehicle Ov.

The fundamental estimating method for the shading area is disclosed by the presently applicant in Patent Document No. 6. The right and left boundary angles ($\alpha 1$) and ($\alpha 2$) for the optical unit 20R, the right and left boundary angles ($\beta 1$) and ($\beta 2$) for the optical unit 20L and the open angle ($\lambda$) are collectively defined as the basic value. The fundamental estimating method can also be employed to estimate a boundary between the shading and the illuminating areas of an opposite side in a turning direction of the subject vehicle Ov when the subject vehicle Ov takes a turn, and also can be employed to estimate a boundary between the shading and the illuminating areas of an opposite side (rear side) in a moving direction of the forward vehicle Fv when the forward vehicle Fv moves a rightward and leftward direction toward the subject vehicle Ov.

Therefore, beam light A4 shown in FIG. 5b, which corresponds to the first central lights such as CL1a of FIG. 6 and CL2a of FIG. 6, can be formed in accordance with the basic value. Specifically, each of light-emitting angles A4R and A4L of the optical unit 20R attached to the front right of the subject vehicle Ov can be set up at the right and left boundary angles ($\alpha 1$) and ($\alpha 2$), respectively. Each of light-emitting angles A4R and A4L of the optical unit 20 L attached to the front left of the subject vehicle Ov can be set up at the right and left boundary angles ($\beta 1$) and ($\beta 2$), respectively. Specific values of the light-emitting angles A4R and A4L can be set up in accordance with an evaluation table of FIG. 19 described later when the subject vehicle is a vehicle shown in FIG. 16b, and should be set up in accordance with an evaluation table based upon features such as a distance between the optical unit 20R and 20L incorporated into the own vehicle, etc.

Therefore, a light-emitting angle of a high beam light corresponding to the first central light CL1a of the first white LEDs emitted from the light-emitting surface 41LS can be inclined in substantially parallel with the imaginary surface IP with respect to the optical axis Ax of the projector lens 41 in an opposite direction of one of both front sides of the subject vehicle Ov incorporating the optical unit 20R and 20L.

On the other hand, because beam light A4 for a low beam shown in FIG. 5b, which corresponds to the second central light CL2a such as CL2a of FIG. 6, may not usually giving a glare type light to the vehicle Fx, each of light-emitting angles A4R and A4L for a low beam is not necessarily based on the basic value. For example, even when the distance between the subject vehicle Ov and the forward vehicle Fv is very short, beam light A4 may not emit a glare type light to the vehicle Fx by reducing a brightness of the beam light A4 for a low beam.

Accordingly, the light-emitting angle of the beam light corresponding to the first central light CL1a of the first white LEDs can be smaller than that of the beam light corresponding to the second central light CL2a of the second white LEDs, and also the number of the first white LEDs can be larger than the number of the second white LEDs, as shown in FIG. 7b.

FIG. 9a is an explanatory top view showing an exemplary forward vehicle moving forward on the same driving lane as the subject vehicle using the headlight system, and FIG. 8b is an explanatory top view showing an exemplary estimating method for determining a right boundary of the shading area for the optical unit 20R and 20L when the subject vehicle Ov takes a right turn.

In this case, each of right boundary angles γin and γout for the optical unit 20R and 20L can be estimated by following approximate formulas.

$$\gamma in = a\tan((H-P)/V) + k \times \lambda,$$

$$\gamma out = a\tan((H-P)/V) + k \times \lambda,$$

Here, $H = R - R\cos\theta + L\sin\theta + Q\cos\theta$, $V = R\sin\theta + L\cos\theta - Q\sin\theta$, $\theta = (\theta 1 + \theta 2)/2$, wherein k is a coefficient, H is a distance in X-axis direction between a right door miller of the forward vehicle Fv and the subject vehicle, V is a distance in Y-axis direction therebetween, L is a distance between the right door miller and a rear of the forward vehicle Fv, Q is a distance between the right door miller and a center line in a longitudinal direction of the forward vehicle, P is a distance between a right and left headlight and a center line in a longitudinal direction of the subject vehicle Ov, each of θ1 and θ2 is the same angle as shown in FIG. 8a and therefore θ shows an angle in a direction of the forward vehicle Fv toward the subject vehicle Ov, and R is a turning radius. The boundary angles γin and γout in a turning direction of the optical unit 20R and 20L are collectively defined as second basic value.

"k×λ," in the above-described formulas is to set up clearances for a location of the right door miller, and K can be, for example, 0.2. Parameters L, Q and P can be stored in the memory 12 according to vehicle family, and as exemplary parameters of a passenger car, L can be 2.8 meters, Q can be 1.0 meter, and P can be 0.7 meters. Accordingly, the larger L and Q are, the larger the shading area is, because a size of the forward vehicle Fv may become larger.

The turning radius R can be calculated by the following formula, when the subject vehicle Ov is a front drive vehicle, and when the subject vehicle Ov is a rear drive vehicle, the turning radius R can be also calculated by the similar formula.

$$R = W/(T - \epsilon f + \epsilon r),$$

wherein W is a wheelbase, T is a tire angle of a front tire, εf is a slip angle of the front tire, and εr is s slip angle of a rear tire. A tire angle of the front tire T is a specific function based upon a steering angle of a vehicle, and each of the slip angle of front tire εf and the slip angle of the rear tire εr is a specific function based upon the steering angle and a vehicle speed as shown as T=f1 (str), εf=f2 (str, vel), and εr=g2 (str, vel), in which each of str and vel shows the steering angle and the vehicle speed, respectively.

3. Additional Embodiments of the Disclosed Subject Matter

Figure 10A:
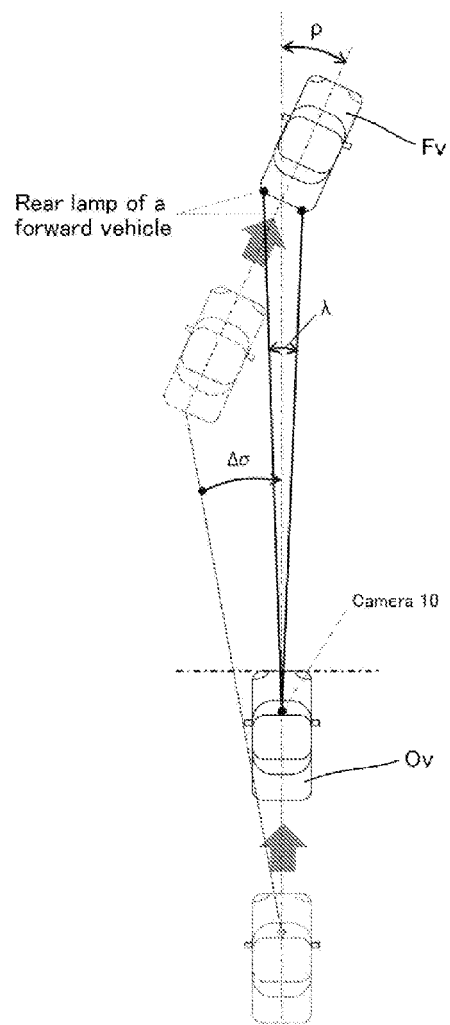
FIG. 10a is an explanatory top view showing an exemplary forward vehicle moving in a right-forward direction with respect to the subject vehicle taking a straight line.
Figure 10B:
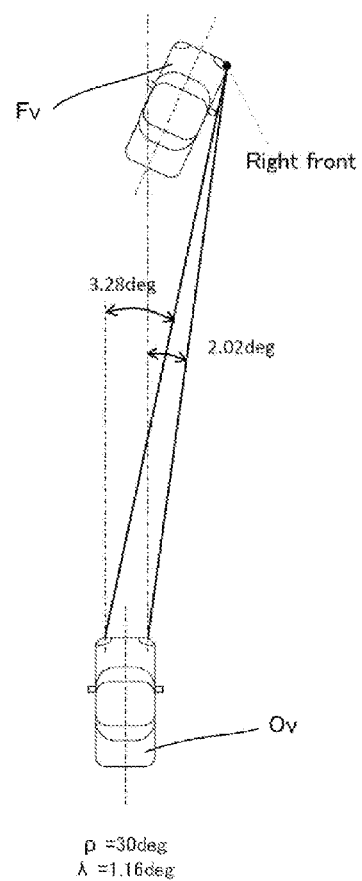
FIG. 10b is an explanatory top view showing an exemplary revising method for determining a right boundary of a shading area for the optical unit 20R and 20L of the subject vehicle.

The disclosed subject matter can include embodiments that modify the above-described shading area to further improve the shading area, when the forward vehicle Fv moves in a rightward and leftward direction toward the subject vehicle Ov. FIG. 10a is an explanatory top view showing an exemplary forward vehicle moving in a right-forward direction with respect to the subject vehicle taking a straight line, and FIG. 10b is an explanatory top view showing an exemplary revising method for determining a right boundary of a shading area for the optical unit 20R and 20L of the subject vehicle Ov.

In this case, the system controller 11 can detect a moving speed of the forward vehicle Fv with respect to the subject vehicle Ov at a prescribed interval in accordance with the image data output from the camera 10. The moving speed (angle rate) $\Delta\sigma = \sigma 1 - \sigma 0$, wherein σ1 is a current location (angle), σ0 is a previous location (angle), and a measurement position is a center between the rear lamp of the forward vehicle Fv, as shown in FIG. 10a.

Here, an additional revision $U = f3(\rho, \lambda)$ can be calculated in accordance with a relative angle ρ of the forward vehicle Fv with respect to the subject vehicle Ov and the open angle (λ). The relative angle $\sigma = f4$ (the vehicle speed vel, the moving speed Δσ). When each of revised values of the optical unit 20R and 20L, which are attached to a right front and left front of the subject vehicle Ov, respectively, is defined as Ur and Ul, respectively, each of Ur and Ul can be calculated by the following formulas.

$$Ur = \{5\rho^2 - (27\lambda - 402)\rho + 3\lambda - 2,875\}\lambda/10,000$$

$$Ul = \{8\rho^2 - (35\lambda - 367)\rho + 285\lambda - 1,095\}\lambda/10,000$$

$$\rho = |\Delta\sigma|/(0.00563 \times vel)$$

Each of the calculated values Ua and Ub can be added into values in the moving direction of the front vehicle Fv among γin, γout, α1, α2, β1, and β2. FIG. 11 is a table showing an exemplary comparison between the basic value and total values adding the revised value into the basic value, wherein ρ is the relative angle of the forward vehicle Fv, D is a distance between the forward vehicle Fv and the subject vehicle Ov, λ is the open angle and each of AR and AL is an angle of a right end in a right-turning direction of the frontward vehicle Fv with respect to each optical axis AX of the optical unit 20R and 20L, respectively.

For example, FIG. 10b shows a case where the own vehicle speed vel is 50 (Km/h), the moving speed Δσ (of the front vehicle) is 8.4 degrees/second, and the distance D between the forward vehicle Fv and the own vehicle Ov is 60 meters. In this case, according to the basic value, the right boundary angle α1 between the shading and the illuminating areas for the optical unit 20R is 0.58 degrees, the open angle λ (=θ1−θ2) is 1.16 degrees, and the right boundary angle β1 between the shading and the illuminating areas for the optical unit 20L is 1.51 (=θ1+0.8×λ) degrees, as shown by black faces in FIG. 11.

However, a first right boundary angle AR of a virtual line connecting a right front of the forward vehicle Fv to the optical unit 20R with respect to the optical axis AX of the optical unit 20R becomes 2.02 degrees, and a second right boundary angle AL of a virtual line connecting the right front of the forward vehicle Fv to the optical unit 20L with respect to the optical axis AX of the optical unit 20L becomes 3.28 degrees, as shown in FIG. 10b.

In view of the revised value, because the subject vehicle speed vel is 50 (Km/h), the moving speed Δσ is 8.4 degrees/second and the open angle λ is 1.16 degrees, and the relative moving angle $\rho = |\Delta\sigma|/(0.00563\{8\rho^2 - (35\lambda - 367)\rho + 285\lambda - 1,095\}\lambda/10,000 \text{ vel}) = |8.4|/(0.00563 \times 50) \approx 30$ (degrees), $$Ur = \{5\rho^2 - (27\lambda - 402)\rho + 3\lambda - 2,875\}\lambda/10,000 = \{5 \times 302 - (27 \times 1.16 - 402) \times 30 + 3 \times 1.16 - 2,875\} \times 1.16/10,000 = 1.48 \text{ (degrees)}.$$

$Ul=\{8\rho^2-(35\lambda-367)\rho+285\lambda-1,095\}\lambda/10,000=\{8\times 302-(35\times1.16-367)\times1.16+285\times1.16-1,095\}\times 1.16/10,000=1.88$ (degrees).

Therefore, total values including the revised values are as follows. As to the first right boundary angle for the optical unit 20R: $\alpha1+Ur=0.58+1.48=2.06$. As to the second right boundary angle for the optical unit 20L: $\beta1+Ul=1.51+1.88=3.39$. Thus, each of the total value (2.06 degrees) for the first right boundary angle of the optical unit 20R and the total value (3.39 degrees) for the second right boundary angle of the optical unit 20L is slightly larger than the boundary angle of 2.02 and 3.28 degrees, respectively. Therefore, the total value including the revised value of the disclosed subject matter can be estimated at an optimal position such that can prevent giving a glare type light to the forward vehicle Fv while giving an optimal wide view to a driver for the subject vehicle Ov.

4. Basic Estimation Algorithm of the Disclosed Subject Matter

FIG. 12 is a table showing an exemplary basic estimation algorithm of the vehicle headlight. A basic algorithm for estimating the boundaries between the shading area and the illuminating area can be selected by a combination of a traveling condition of the subject vehicle Ov incorporating the vehicle headlight and a moving condition of the forward vehicle Fv.

The traveling condition of the subject vehicle Ov can fall into three categories based upon the traveling condition of turning left, turning right and taking a straight line. The traveling condition can be determined as follows by the turning radius R of the subject vehicle Ov and a predetermined threshold u (e.g., 200 meters) for the turning radius. If $R<-u$, or, if $+u<R$, the subject vehicle Ov is taking a straight line. If $0<R\leq+u$, the subject vehicle Ov is taking a right turn, and if $-u\leq R<0$, the subject vehicle Ov is taking a left turn.

The moving condition of the forward vehicle Fv can be classified as five conditions in terms of a big move leftward, a small move leftward, no change, a small move rightward and a big move rightward. In these cases, the moving condition can be determined as follows by the moving speed $\Delta\sigma$ of the forward vehicle Fv, a first threshold n1 (e.g., 1 degree/second) for the moving speed and a second threshold n2 (e.g., $n2>n1$ such as 10 degrees/second) for the moving speed. If $\Delta\sigma<-n2$, the forward vehicle is in a big move leftward. If $-n2\leq\Delta\sigma<-n1$, the forward vehicle is in a small move leftward. If $-n1\leq\Delta\sigma<+n1$, the forward vehicle is in no change. If $+n1\leq\Delta\sigma<+n2$, the forward vehicle Fv is in a small move rightward. If $+n2\leq\Delta\sigma$, the forward vehicle Fv is in a big move rightward.

According to the disclosed subject matter, the algorithm for estimating the boundaries can vary in accordance with the traveling condition of the subject vehicle and the moving condition of the forward vehicle. When the subject vehicle is taking a straight line and the forward vehicle is in a position of no change such that it is taking a straight line at the same speed as the own vehicle, the boundaries between the shading area and the illuminating area can be estimated in accordance with the basic value, as shown in FIG. 12, by the fundamental estimating method based on the basic control described above (see mark 71 in FIG. 11).

When the subject vehicle is taking a straight line and the forward vehicle moves in either leftward or rightward direction, each inner side of the boundaries between the shading area and the illuminating area can be estimated by adding the revised value, as shown in FIG. 10, into the basic value calculated by the fundamental estimating method based on the basic control regardless of big move and small move (see mark 72). Each outer side of the boundaries can be estimated in accordance with the basic value calculated by the fundamental estimating method based on the basic control regardless of big move and small move.

When the subject vehicle is taking a turn and the forward vehicle is in the position of no change, each inner side of the boundaries between the shading area and the illuminating area can be estimated in accordance with the second basic value calculated by the method for taking a turn based on the basic control when the subject vehicle takes a leftward and rightward turn (see mark 73), and each outer side of the boundaries can be estimated in accordance with the basic value calculated by the fundamental estimating method based on the basic control.

Meanwhile, when the subject vehicle is taking a turn and the forward vehicle also takes a turn in the same direction as the subject vehicle, each inner side of the boundaries between the shading area and the illuminating area can be estimated by adding the revised value into the second basic value calculated by the method for taking a turn based on the basic control when the subject vehicle takes a leftward and rightward turn regardless of big move and little move (see mark 74), and each outer side of the boundaries can be estimated in accordance with the basic value calculated by the fundamental estimating method based on the basic control regardless of big and small.

In addition, when the subject vehicle is taking a turn and the forward vehicle also takes a turn in an opposite direction toward the subject vehicle, each estimation of the boundaries between the shading area and the illuminating area can be selected by a moving amount of the forward vehicle. For example, when the forward vehicle slightly moves rightward such that the forward vehicle changes lane while the own vehicle is taking a turn, each outer side of the boundaries between the shading area and the illuminating area can be estimated by adding the revised value into the second basic value calculated by the method for taking a turn based on the basic control when the own vehicle takes a leftward and rightward turn (see mark 75), and each inner side of the boundaries can be estimated in accordance with the basic value calculated by the fundamental estimating method based on the basic control.

On the contrary, when the forward vehicle moves widely in an opposite direction toward the subject vehicle such that the forward vehicle may not move on a same curved roadway as the subject vehicle while the subject vehicle is taking a turn, each outer side of the boundaries between the shading area and the illuminating area can be estimated by adding the revised value into the basic value calculated by the fundamental estimating based on the basic control (see mark 76), and each inner side of the boundaries can be estimated in accordance with the basic value calculated by the fundamental estimating method.

5. First Flow Charts for Running the Algorithm Described Above

Figure 13:
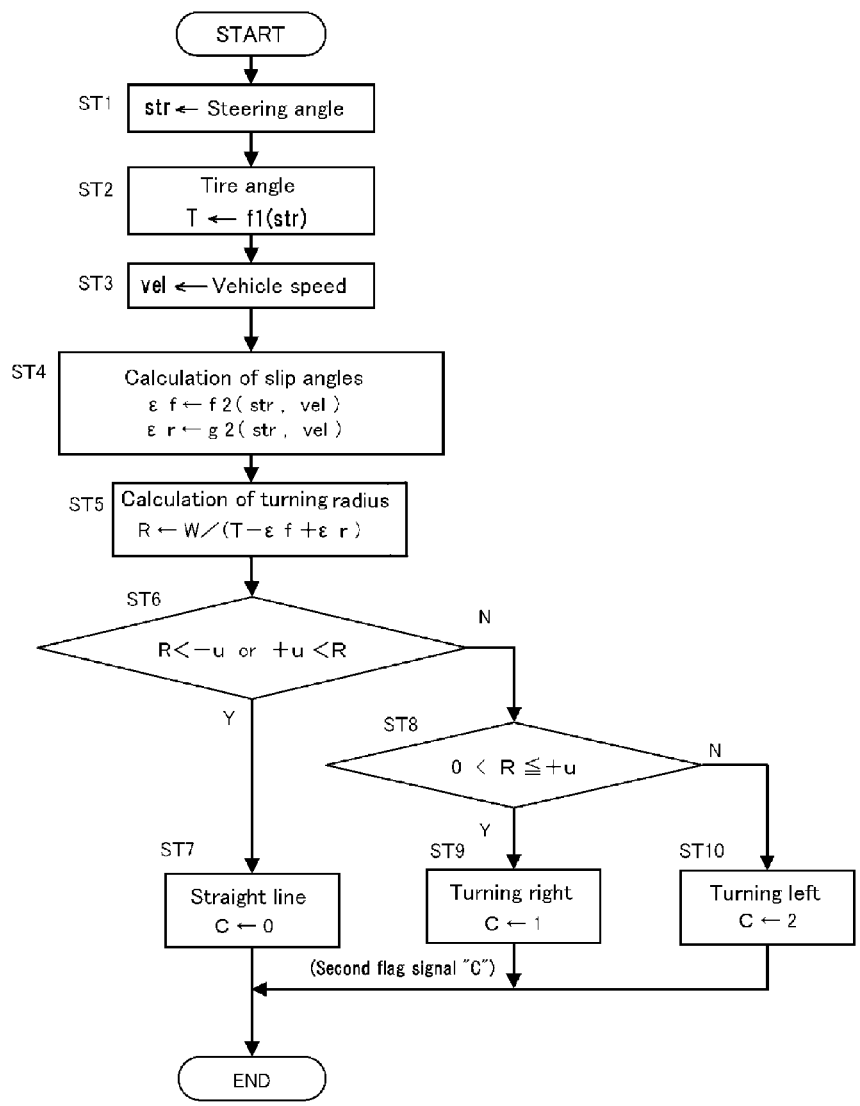
FIG. 13 is a first exemplary flow chart for detecting traveling conditions of the subject vehicle incorporating the vehicle headlight of FIG. 1.

Flow charts to run the algorithm in the vehicle headlight will now be described with reference to FIG. 13 to FIG. 15. FIG. 13 is a first exemplary flow chart for detecting the traveling conditions of the own vehicle incorporating the headlight system. The circling detector 14 of the system controller 11 shown in FIG. 1 can detect the traveling conditions of the own vehicle by executing the flow chart of FIG. 13 at a predetermined interval.

The flow chart for detecting the traveling conditions of the subject vehicle can include (ST1) receiving a steering angle from the rudder angle signal shown in FIG. 1 and inputting the steering angle into Parameter str; (ST2) calculating a tire angle T based upon Function f1 (str); (ST3) receiving a vehicle speed from the speed signal shown in FIG. 1 and inputting the vehicle speed into Parameter vel; (ST4) calculating each of the slip angle ∈f of front tire and the slip angle ∈r of rear tire in accordance with Functions f2 (str, vel) and g2 (str, vel), respectively; (ST5) calculating a turning radius R by using Formula R=W/(T−∈f+∈r), in which the wheelbase W is stored in the memory 12.

In addition, the flow chart can also include: (ST6) comparing the turning radius R with thresholds −u and +u; (ST7) storing "0" into the second flag signal (C), in case where if R is one of less than −u and more than +u, the circling detector 14 determining that the own vehicle takes a straight line in ST6; (ST8) comparing the turning radius R with +u; (ST9) storing "1" into the second flag signal (C), in case where if R is +u or less, the circling detector 14 determining that the own vehicle takes a right turn in ST8; and (ST10) storing "2" into the second flag signal (C), in case where if R is not +u or less, the circling detector 14 determining that the own vehicle takes a left turn in ST8.

Figure 14:
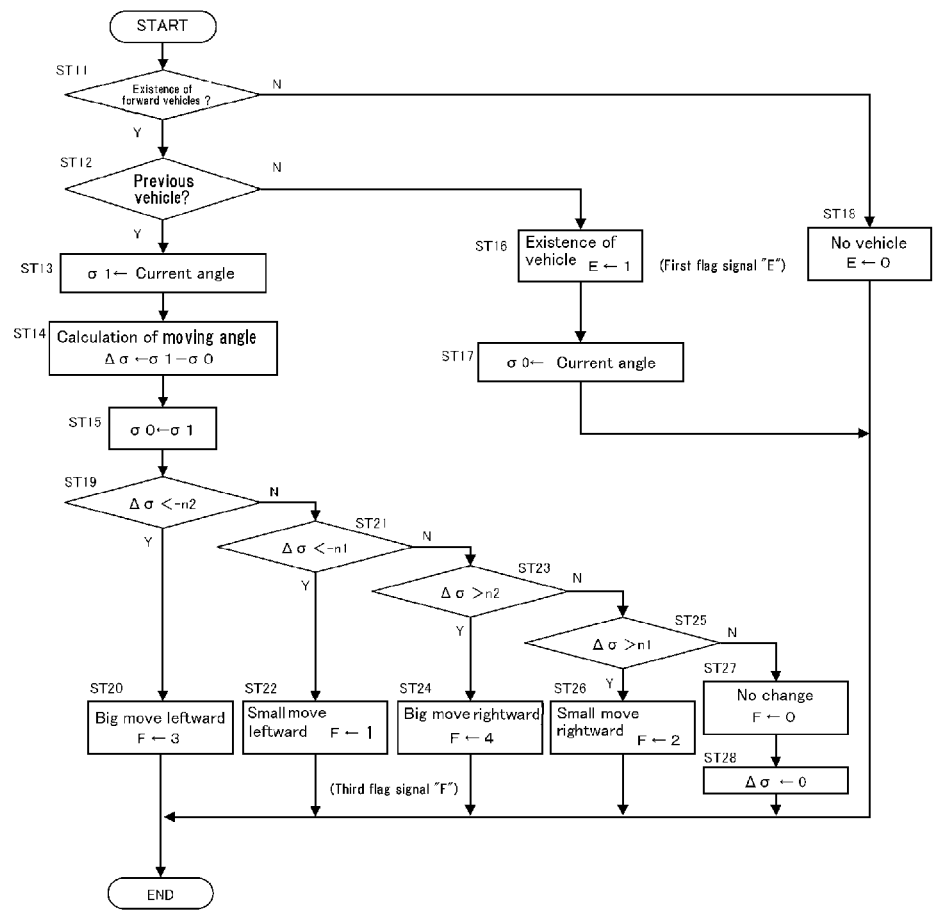
FIG. 14 is a first exemplary flow chart for detecting moving conditions such as a moving direction of a forward vehicle from the subject vehicle incorporating the vehicle headlight of FIG. 13.

FIG. 14 is a first exemplary flow chart for detecting moving conditions such as a moving direction of the forward vehicle from the subject vehicle incorporating the headlight system of FIG. 13. The vehicle movement detector 16 of the system controller 11 shown in FIG. 1 can confirm existence or non-existence of various forward vehicles in accordance with the first flag signal (E) and can detect the moving conditions of the forward vehicle, which travels in a forward direction of the own vehicle, by executing the flow chart of FIG. 14 at a predetermined interval.

The flow chart for detecting the moving conditions of the forward vehicle can include: (ST11) judging existence or non-existence of a forward vehicle in accordance with the first flag signal (E); when judging the existence of the forward vehicle in ST11, (ST12) judging whether the forward vehicle is the same vehicle that is judged in previous ST11, that is, whether "1" is stored at the first flag signal (E); (ST13) storing a current angle of the forward vehicle at Parameter σ1; (ST14) calculating a moving angle of the forward vehicle Δσ based upon the formula (Δσ←σ1−σ0); (ST15) storing σ1 at Parameter σ0; when the first flag signal (E) does not store "1", (ST16) storing "1" at the first flag signal (E); (ST17) storing a current angle of the forward vehicle at Parameter σ0; and when judging the non-existence of the forward vehicle in ST11, (ST18) storing "0" at the first flag signal (E).

In addition, the flow chart for detecting the moving conditions of the forward vehicle can also include: (ST19) comparing the moving angle Δσ with the threshold −n2; if Δσ<−n2, (ST20) storing "3" at the third flag signal (F), wherein the vehicle movement detector 16 judges that the forward vehicle moves widely in a leftward direction toward the own vehicle; unless Δσ<−n2 in ST19, (ST21) comparing the moving angle Δσ with the threshold −n1; if Δσ<−n1, (ST22) storing "1" at the third flag signal (F), wherein the vehicle movement detector 16 judges that the forward vehicle moves slightly in the leftward direction toward the own vehicle; unless Δσ<−n1 in ST21, (ST23) comparing the moving angle Δσ with the threshold n2; if Δσ>n2, (ST24) storing "4" at the third flag signal (F), wherein the vehicle movement detector 16 judges that the forward vehicle moves widely in a rightward direction toward the own vehicle; unless Δσ>n2 in ST23, (ST25) comparing the moving angle Δσ with the threshold n1; if Δσ>n1, (ST26) storing "2" at the third flag signal (F), wherein the vehicle movement detector 16 judges that the forward vehicle moves slightly in the rightward direction toward the own vehicle; unless Δσ>n1 in ST 25, (ST27) storing "0" at the third flag signal (F); and (ST28) storing "0" at Parameter of the moving angle Δσ.

In the flow chart described above, when the vehicle detector 13 acknowledged a plurality of forward vehicles in ST11 and ST 12, the vehicle detector 13 labels the plurality of forward vehicles as each one vehicle, and the vehicle moving detector 6 can detect moving conditions of each of the forward vehicles, which travel in a forward direction of the subject vehicle, by executing the flow chart at the predetermined interval.

Figure 15A:
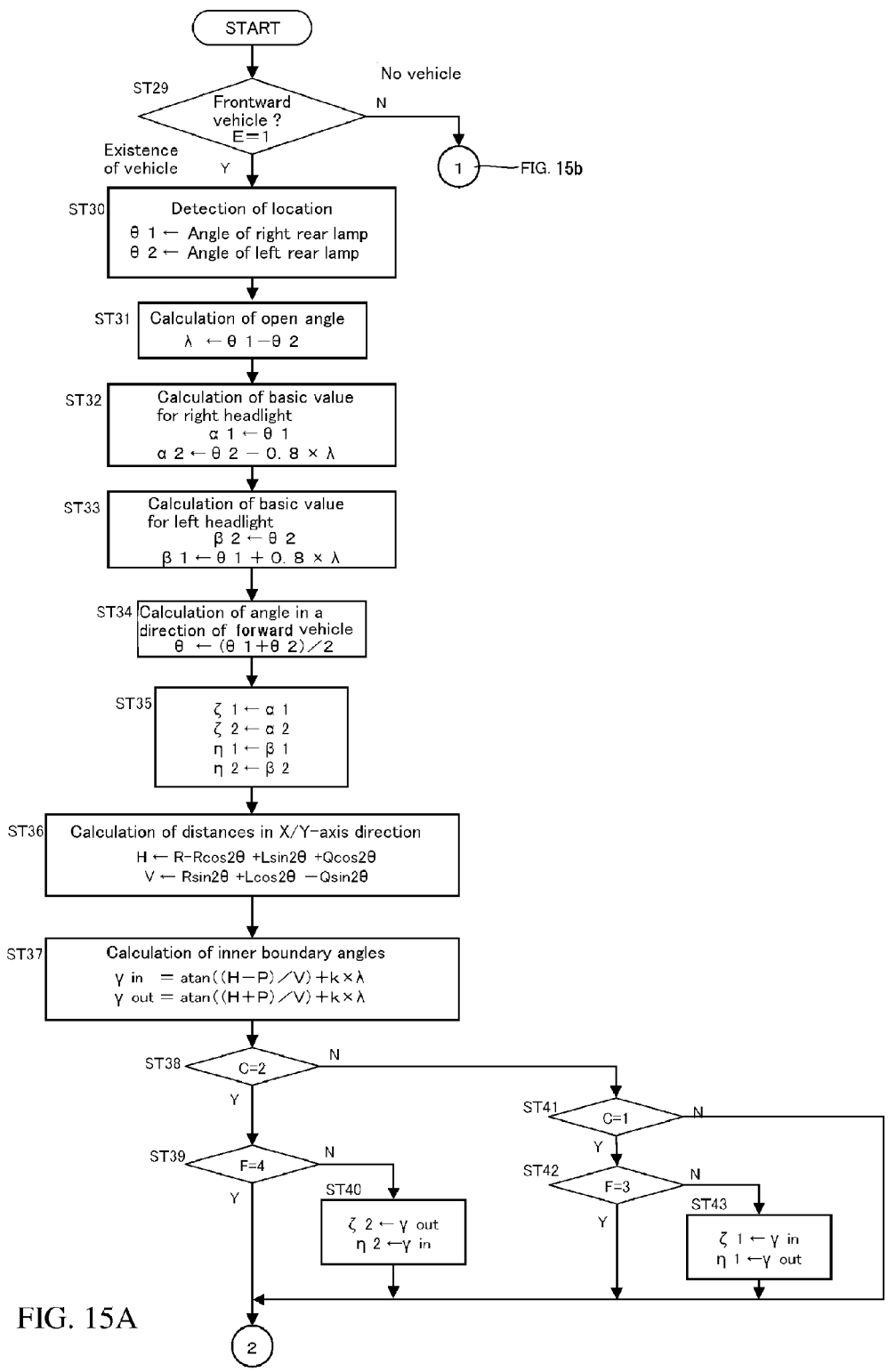
FIGS. 15a and 15b are first exemplary flow charts for calculating boundaries between the shading area and the illuminating area, which are formed by the subject vehicle incorporating the vehicle headlight of FIG. 13.
Figure 15B:
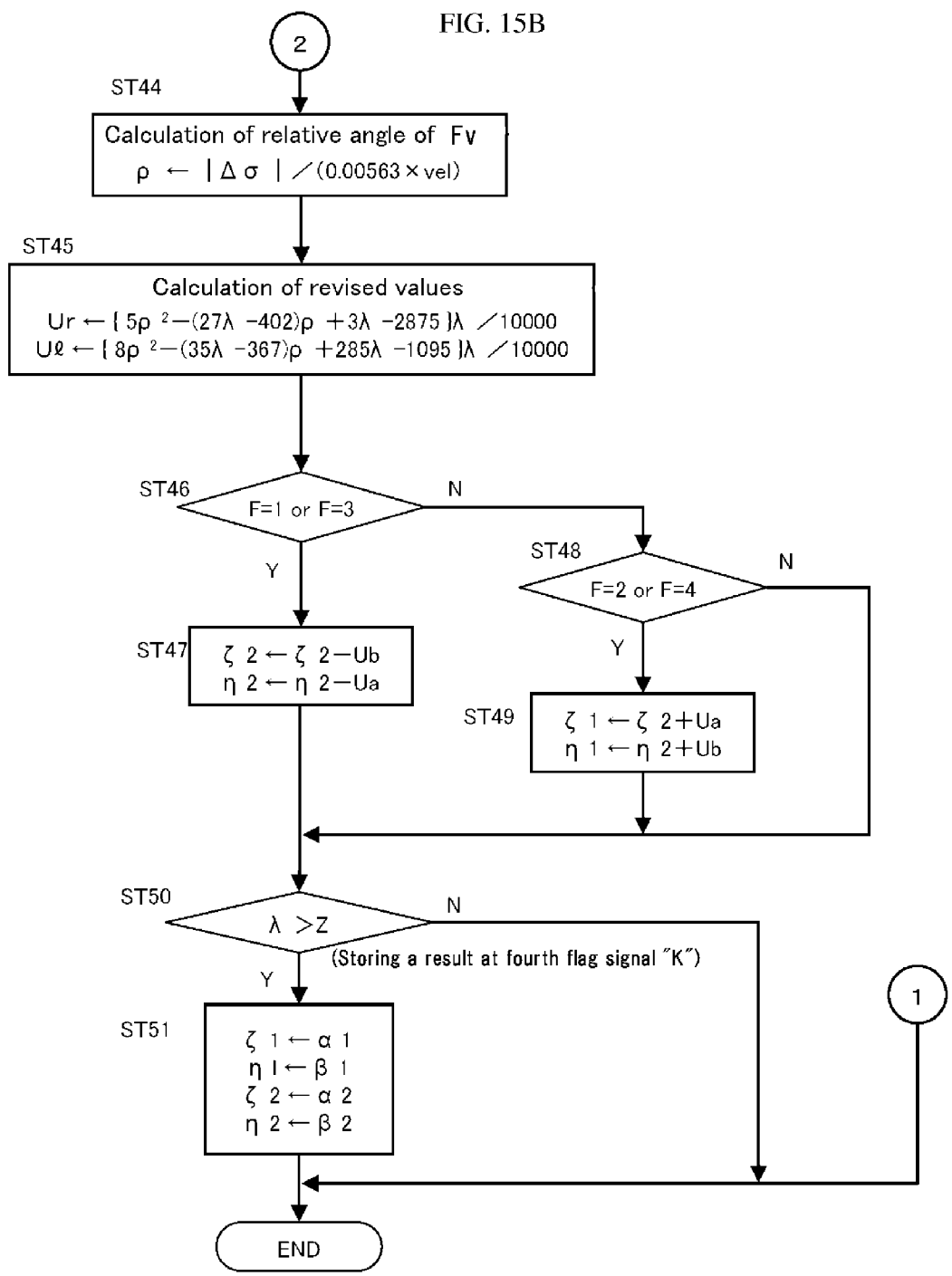

FIGS. 15a and 15b are exemplary flow charts for calculating boundaries between the shading area and the illuminating area, which are formed by the own vehicle incorporating the headlight system. The shading area controller 15 of the system controller 11 shown in FIG. 1 can estimate a rightward boundary 1 and a leftward boundary ζ2 between the shading area and the illuminating area formed by the optical unit 20R, which is attached to a front right of the subject vehicle, and also can estimate a rightward boundary η1 and a leftward boundary η2 formed by the optical unit 20L, which is attached to a front left of the own vehicle, by executing the flow charts at a predetermined interval.

The flow charts for calculating boundaries between the shading area and the illuminating area can include: (ST29) judging existence or non-existence of the forward vehicle, and unless "1" is stored at the first flag signal (E), moving to mark 1 in FIG. 15b described later; if the shading area detector 15 judges the existence of the forward vehicle in accordance with the first flag signal (E) in ST29, (ST30) detecting a location of the forward vehicle such as θ1 and θ2, which are angles of a right and rear lamp of the forward vehicle from the own vehicle, respectively; (ST31) calculating an open angle λ (=θ1−θ2) of the forward vehicle; (ST32) calculating the basic value α1 (=θ1) and α2 (=θ2−0.8×λ) of a rightward and leftward boundary angle for a right headlight (optical unit 20R); (ST33) calculating the basic value β2 (=θ2) and β1 (=θ1+0.8×λ) of a rightward and leftward boundary angle for a left headlight (optical unit 20L); (ST34) calculating an angle θ (=(θ1+θ2)/2) in a direction of the forward vehicle from the own vehicle; (ST35) setting up α1 and α2 at the rightward and leftward boundary angle ζ1 and ζ2 of the optical unit 20R, respectively, and also setting up β1 and β2 at the rightward and leftward boundary angle η1 and η2 of the optical unit 20L, respectively.

Additionally, the flow charts for calculating the boundaries can also include: (ST36) calculating distances H, V in a direction of X/Y-axis between a door miller in a turning inner direction of the forward vehicle and the own vehicle in accordance with the formulas H=R−R cos θ+L sin θ+Q cos θ, and V=R sin θ+L cos θ−sin θ, respectively; (ST37) calculating boundary angles γin (=a tan ((H−P)/V)+k×λ) and γout (=a tan ((H−P)/V)+k×λ) between the shading and illuminating area in the turning inner direction of the forward vehicle to the optical unit 20R and 20L, respectively, (ST38) checking the second flag signal (C) (refer to ST9 and ST10 in FIG. 13); if the second flag signal (C) is 2, (ST39) checking the third flag signal (F) (refer to ST24 in FIG. 14) and if Flag F is 4, moving to mark 2 in FIG. 15b described later; unless the third flag signal (F) is 4 in ST39, (ST40) setting up γout at the leftward boundary ζ2 for the optical unit 20R, and also setting up γin at the leftward boundary η2 for the optical unit 20L and finally moving to mark 2; unless the second flag signal (C) is 2 in ST38, (ST41) referring to the second flag signal (C) again, if the flag (C) is not 1, then moving to mark 2; if the flag (C) is 1, (ST42) checking the third flag signal (F), and if "3" is stored at the flag (F), then moving to mark 2, else moving to (ST43); and (ST43) setting up γin and γout at the rightward boundary ζ1 for the optical unit 20R and at the rightward boundary η2 for the optical unit 20L and moving to mark 2.

Moreover, in order for the shading area detector 15 to decide whether an additional revision is needed or not, the flow charts for calculating the boundaries (staring from mark 2 in FIG. 15b) can include: (ST44) calculating the relative moving angle ρ (=|Δσ|/(0.00563×vel) of the forward vehicle Fv to the own vehicle Ov; (ST45) calculating the revised value Ur (={5ρ²−(27λ−402)ρ+3λ−2,875}λ/10,000) and Ul (={8ρ²−(35λ−367)ρ+285λ−1,095}λ/10,000); (ST46) checking whether the front vehicle moves leftward or not by using the third flag signal (F) (see ST20 and ST22 in FIG. 14); if ST46 is Yes, (ST47) calculating revised by adding the revised value −Ul into the leftward boundary ζ2 for the optical unit 20R, and calculating revised η2 by adding the revised value −Ur into the leftward boundary η2 for the optical unit 20L; if ST46 is No, (ST48) checking whether the front vehicle moves rightward or not (see ST24 and ST26 in FIG. 14); if ST48 is Yes, (ST49) calculating revised 1 by adding the revised value Ur into the rightward boundary for the optical unit 20R, and calculating revised η1 by adding the revised value Ul into the rightward boundary 112 for the optical unit 20L; (ST50) checking whether the forward vehicle is close to the own vehicle (for example, when Z is 8 degrees, a distance between the forward vehicle and the own vehicle corresponds to approximately 10 meters) and storing the result at the fourth flag signal (K), if necessary; if ST 50 is Yes, (ST51) storing α1, β1, α2 and β2 at ζ2 and η2, respectively; and if ST 50 is No, moving to END along with mark 1 in FIG. 15a.

6. Evaluation Result of the Headlight System of the Disclosed Subject Matter

Figure 16A:
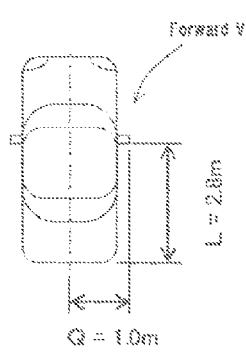
FIG. 16a is a top view showing an exemplary forward vehicle.
Figure 16B:
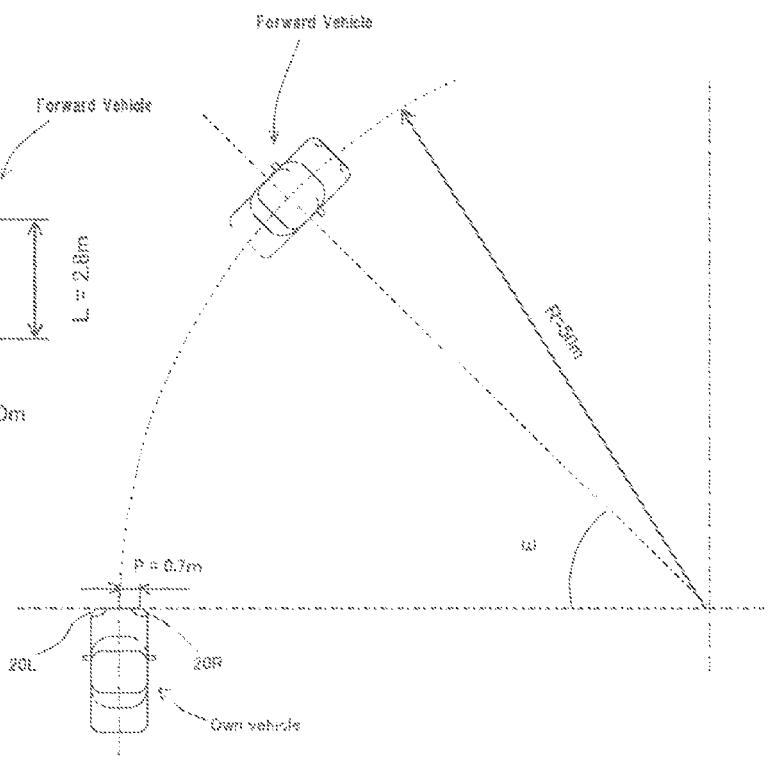
FIG. 16b is an explanatory top view showing an exemplary evaluation model for a subject vehicle incorporating the vehicle headlight including the optical unit 20R and 20L shown in FIG. 1, wherein the forward vehicle of FIG. 16a takes a right turn in a forward direction of the subject vehicle.

FIG. 16a is a top view showing an exemplary forward vehicle, and FIG. 16b is an explanatory top view showing an exemplary evaluation model for a subject vehicle incorporating the vehicle headlight including the optical unit 20R and 20L shown in FIG. 1, wherein the forward vehicle of FIG. 16a takes a right turn in a forward direction of the subject vehicle. Each of Parameters L, Q, P, R and ω is a distance between a door miller and a rear of the forward vehicle (2.8 meters), a distance between the door miller and a center in a longitudinal direction of the forward vehicle (1.0 meter), a distance between the optical unit 20R and 20L and a center in a longitudinal direction of the own vehicle (0.7 meters), a turning radius (50 meters) and angles of the forward vehicle with respect to the subject vehicle, respectively.

FIGS. 16a and 16b are top views showing locating relations between the optical unit 20R and 20L of the own vehicle and the forward vehicle to evaluate the algorithm of the disclosed subject matter, respectively. Parameters τ1, τ2 and τ3 are angles of a first virtual line connecting between the optical unit 20L and a left rear edge of the forward vehicle, a second virtual line connecting between the optical unit 20L and a right rear edge of the forward vehicle and a third virtual line connecting between the optical unit 20L and an inner door miller in a turning direction of the forward vehicle, with respect to the optical axis of the optical unit 20L, respectively.

In addition, Parameters v1, v2 and v3 are angles of a first imaginary line connecting between the optical unit 20R and the left rear edge of the forward vehicle, a second imaginary line connecting between the optical unit 20R and the right rear edge of the forward vehicle and a third imaginary line connecting between the optical unit 20R and the inner door miller in a turning direction of the forward vehicle, with respect to the optical axis of the optical unit 20R, respectively.

Figure 17A:
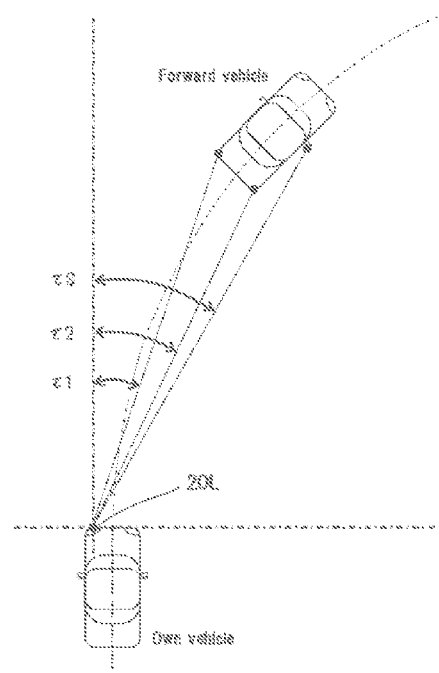
FIGS. 17a and 17b are top views showing locational relationships between the optical unit 20R and 20L of the subject vehicle and the forward vehicle to evaluate the algorithm of the disclosed subject matter, respectively.
Figure 17B:
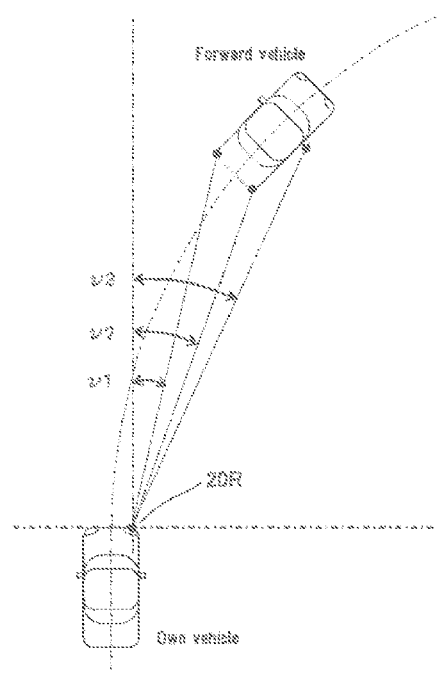

FIG. 18 is a table showing angles (degree) of Parameters τ1, τ2, τ3, v1, v2 and v3 shown in FIGS. 17a and 17b at each of the angles ω of the forward vehicle with respect to the own vehicle. FIG. 19 is a table showing an exemplary evaluation result based on the basic value for the optical unit 20R and 20L at each of the angles ω of the forward vehicle with respect to the subject vehicle. In these cases, it is necessary to satisfy the following terms so that the optical unit 20R and 20L prevents from giving a glare type light to the forward vehicle.

That is to say, τ1>β2, v1>α2 in order for the optical unit 20R and 20L not to illuminate the left rear of the forward vehicle, τ2<β1, v2<α1 in order not to illuminate the right rear of the forward vehicle, and τ3<β1, v3<α1 in order not to illuminate the inner door miller in the turning direction of the forward vehicle. However, the evaluation result based on the basic value for the optical unit 20R and 20L includes values such that cannot satisfy the terms described above, as shown by gray columns in FIG. 19.

FIG. 20 is a table showing an exemplary evaluation result for the optical unit 20R and 20L at each of the angles ω of the forward vehicle in accordance with the algorithm of the disclosed subject matter. According to the evaluation result for the optical unit 20R and 20L at each of the angles ω of the forward vehicle in accordance with the algorithm of the disclosed subject matter, the rightward and leftward boundary angle ζ1 and ζ2 of the optical unit 20R can satisfy the terms, respectively, and also the rightward and leftward boundary angle η1 and η2 of the optical unit 20L can satisfy the terms, respectively. Thus, the vehicle headlight of the disclosed subject matter can prevent the optical unit 20R and 20L from giving a glare type light to the forward vehicle.

7. Second Flow Chart for Calculating the Boundaries of the Shading Area

Figure 21:
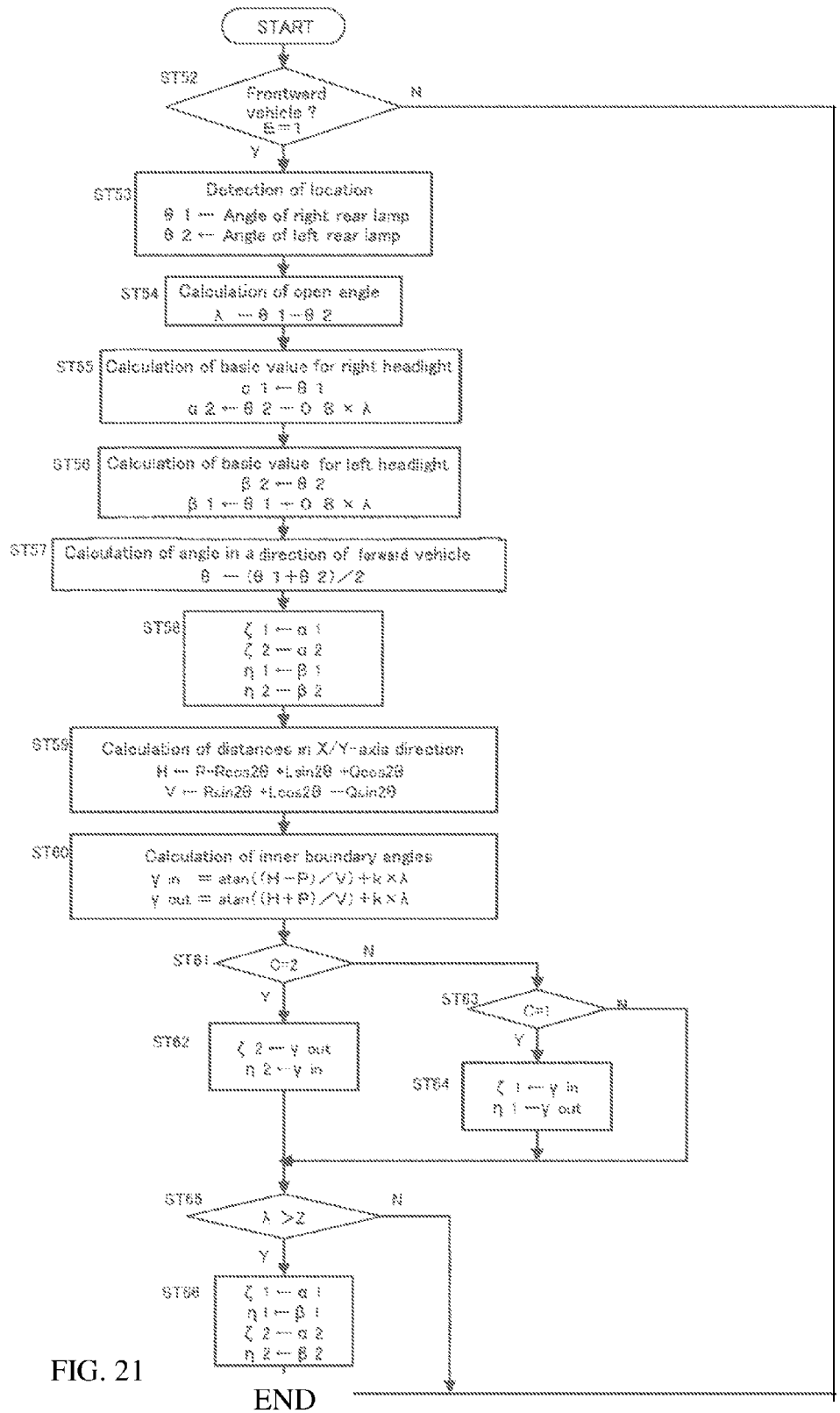
FIG. 21 is a second exemplary flow chart for calculating boundaries between the shading area and the illuminating area, which are formed by the subject vehicle incorporating the vehicle headlight of FIG. 1.

The above-described first flow charts can include the basic value, the second basic value and the additional revised value in the algorithm. However, the disclosed subject matter does not necessarily include the additional revised value in the algorithm. FIG. 21 is a second exemplary flow chart for calculating boundaries between the shading area and the illuminating area, which are formed by the subject vehicle incorporating the headlight system of FIG. 1.

In this case, the vehicle movement detector 16 can be removed from the system controller 11 shown in FIG. 1, and also process of the first flow chart for detecting the moving conditions shown in FIG. 14 can be removed from the algorithm. The system controller 11 can run only the flow chart of FIG. 13 and the second flow chart of FIG. 21, which replaces the flow charts of FIGS. 15a and 15b. The second flow chart can remove ST39, ST 42 and ST44 to ST49 from ST29-ST51 shown in FIGS. 15a and 15b, and ST52 to ST66 of the second flow chart can be the same process as STs corresponding to these of FIGS. 15a and 15b. Therefore, descriptions of the second flow chart are abbreviated.

8. Third Flow Chart for Calculating the Boundaries of the Shading Area

The above-described first flow charts can include the basic value, the second basic value and the additional revised value in the algorithm. However, the disclosed subject matter does not necessarily include the second basic value in the algorithm. In this case, the circling detector 14 can be removed from the system controller 11 shown in FIG. 1, and also process of the first flow chart for detecting the traveling conditions shown in FIG. 13 can be removed from the algorithm. The system controller 11 can run only a third flow chart of FIG. 22, which replaces the flow charts of FIGS. 14, 15a and 15b.

Figure 22:
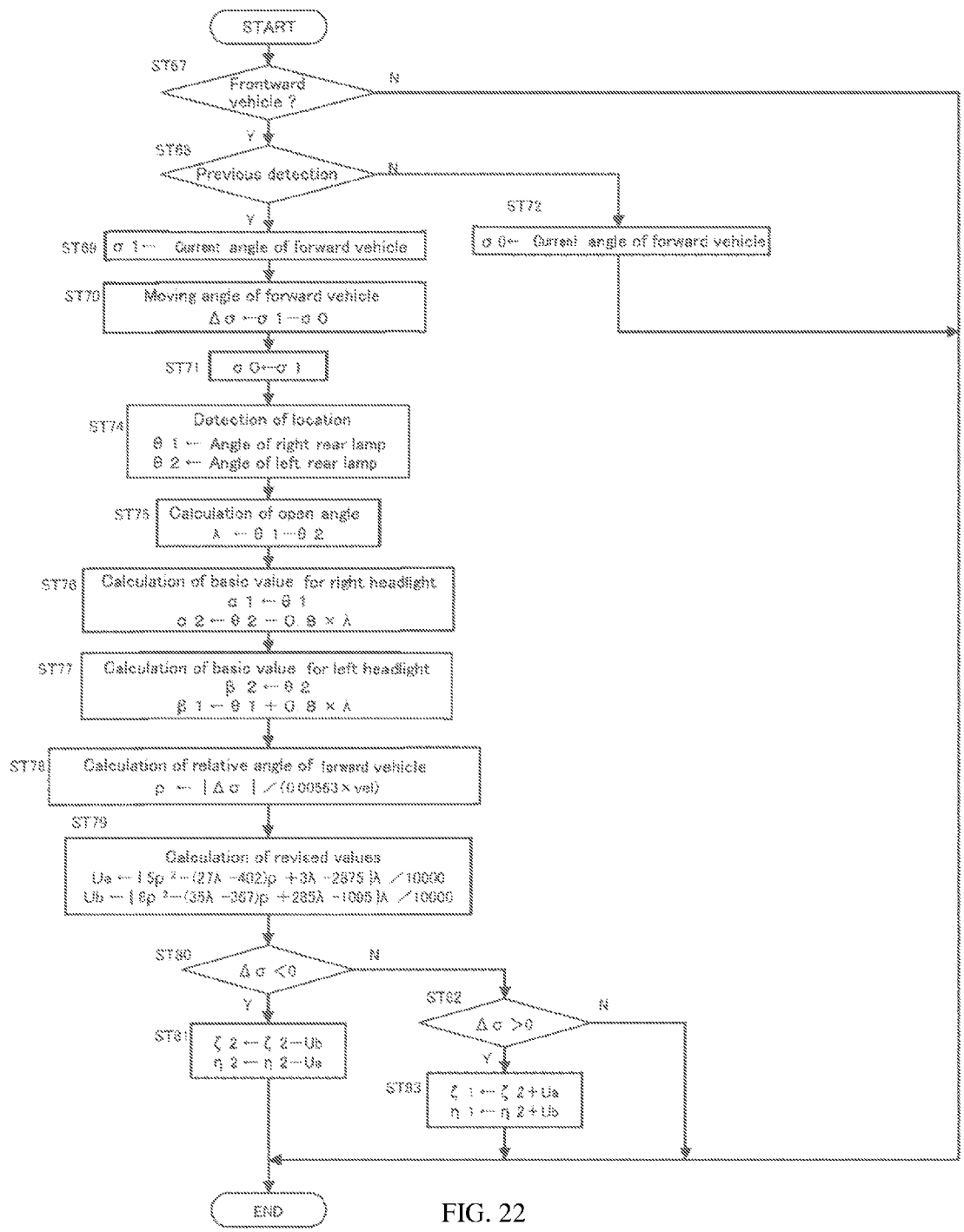
FIG. 22 is a third exemplary flow chart for calculating the boundaries between the shading area and the illuminating area, which are formed by the subject vehicle incorporating the vehicle headlight of FIG. 1.
Figure 23A:
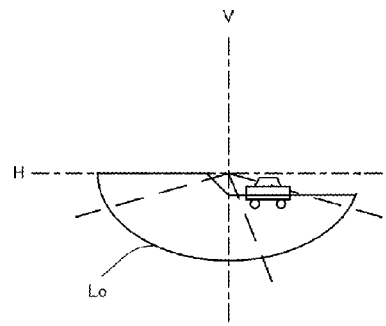
FIGS. 23a to 23f are schematic light distribution patterns depicting light distributions with respect to a horizontal line H and a vertical line V, which may be formed by a first conventional vehicle headlight controller for an adaptive driving beam (ADB) used in countries where drivers keep to the left side of the road.
Figure 23B:
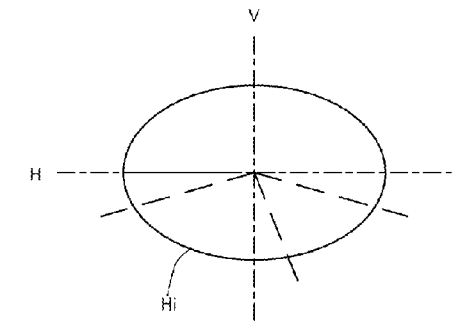
Figure 23C:
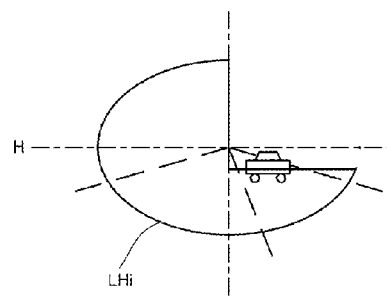
Figure 23D:
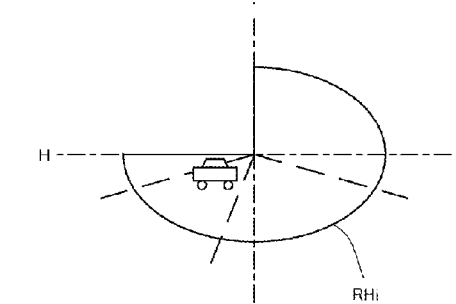
Figure 23E:
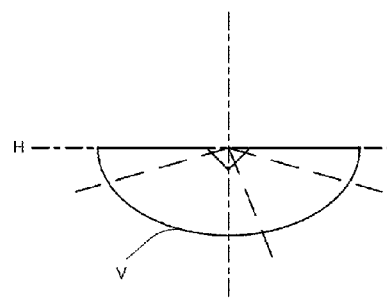
Figure 23F:
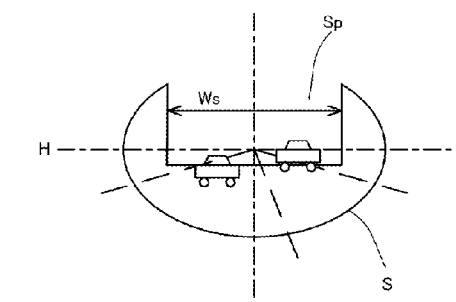
Figure 24:
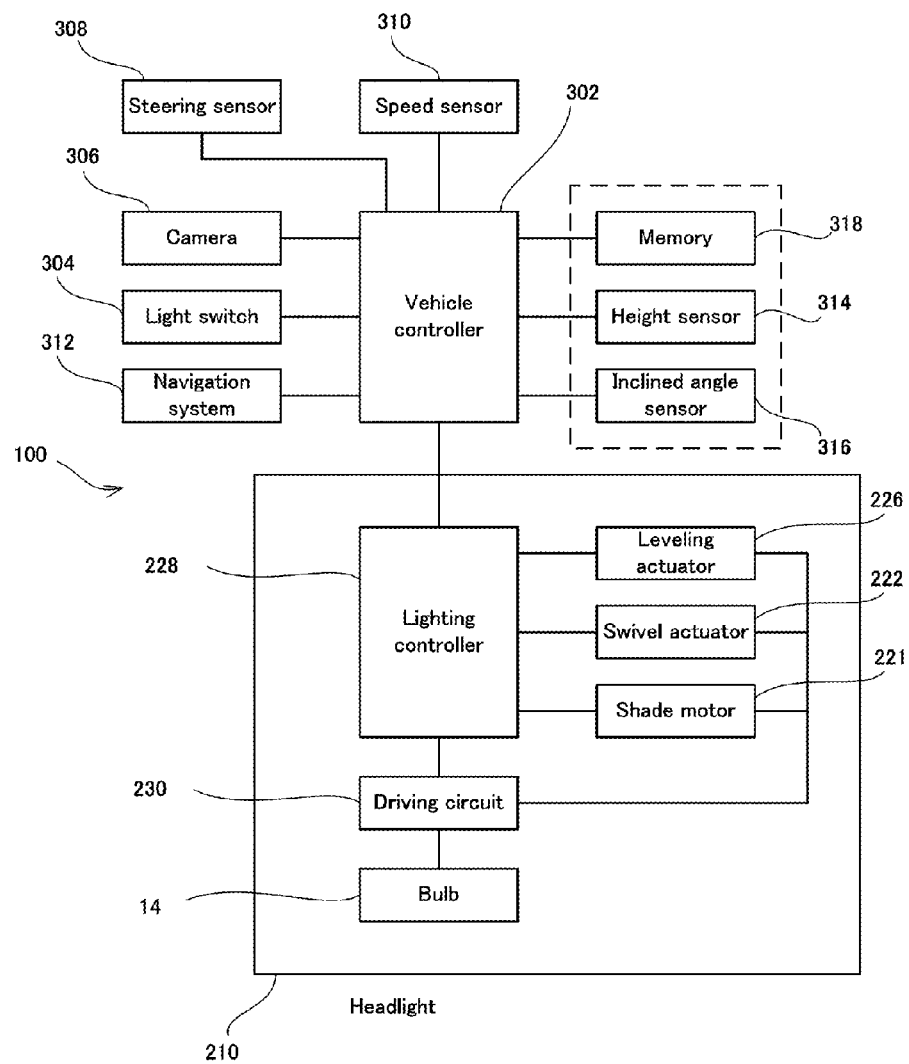
FIG. 24 is a block diagram showing the first conventional headlight controller and a second conventional headlight controller, in which the first conventional headlight does not include a dotted line region.

FIG. 22 is the third exemplary flow chart for calculating boundaries between the shading area and the illuminating area, which are formed by the own vehicle incorporating the vehicle headlight of FIG. 1. ST67 to ST71 can replace ST11 to ST15 of FIG. 14 in the third flow chart, and ST72 of the third flow chart can replace ST17 of FIG. 14. Additionally, ST74 to ST77 can replace ST30 to ST33 of FIG. 15a in the third flow chart. In ST80 of the third flow chart, if ST80 is Yes, then the additional revision can be carried out in ST81 in common with ST47 of FIG. 15b. In ST82, when the shading area controller 15 recognizes that the moving angle Δσ of the forward vehicle is positive, the revised value can be added in ST83 in common with ST49 of FIG. 15b.

According to the exemplary vehicle headlight, the exemplary headlight controller can provide a favorable light distribution pattern to safely drive at night while preventing a right and left headlight from emitting a glare type light to oncoming vehicles and vehicles moving forwards in a forward direction of the own vehicle in accordance with various traffic conditions. The optical unit 20R and 20L can be used as the right and left headlight for the headlight controller by using the beam lights each having a light-emitting angle such that can be used as a high and low beam. Thus, the disclosed subject matter can provide vehicle headlights using the headlight controller and the optical units can provide a favorable light distribution pattern that can be easy to drive at night for not only the subject vehicle but also vehicles traveling near the subject vehicle by utilizing the characteristics of the headlight controller and the optical unit, and which can expand possibilities for design so as to be able to harmonize with various vehicular designs.

Various modifications of the above disclosed embodiments can be made without departing from the spirit and scope of the presently disclosed subject matter. For example, cases where the optical unit 20R and 20L is used as the right and left headlight including a high and low beam. However, the optical unit 20R and 20L is not limited to this structure and can be separated into a high beam and a low beam. In addition, each of optical units for the high beam and the low beam can vary between different designs and also can vary different beam lights having a different light-emitting angle.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. A headlight controller, comprising:
a camera having an optical axis being located adjacent a subject vehicle having a right and left headlight, configured to photograph at least one vehicle having a first point, a second point and a third point located in a forward direction of the subject vehicle, and the camera being configured to output the at least one vehicle photographed by the camera as image data;
a memory storing at least each feature extraction point of the first point, the second point and the third point of the at least one vehicle, a first setup value having a positive and negative value for detecting a traveling condition of the subject vehicle to class whether the subject vehicle takes a straight line, takes a right turn or takes a left turn, and a second setup value for detecting a distance between the subject vehicle and the vehicle included in the image data output from the camera; and
a system controller including a vehicle detector, a shading area controller, a distance detector, a light distribution controller and at least one of a circling detector and a vehicle movement detector, and the system controller configured to receive at least a vehicle speed signal and a steering angle from the subject vehicle, the vehicle detector configured to judge existence or non-existence of the at least one vehicle included in the image data output from the camera in accordance with at least one of the feature extraction points of the first point, the second point and the third point of the vehicle, being configured to store data of the existence or non-existence of the vehicle at a first flag signal, and being configured to detect a first angle and a second angle of two imaginary lines connecting the camera to each of the first point and the second point of the vehicle with respect to the optical axis of the camera by using the image data output from the camera when the first flag signal shows the existence of the vehicle, respectively, and the vehicle detector being configured to calculate a basic value in accordance with the first angle and the second angle, the circling detector configured to calculate a turning radius of the subject vehicle by using at least the vehicle speed signal and the steering angle output from the subject vehicle, being configured to compare the turning radius of the subject vehicle with the first setup value having a positive and negative value, being configured to store data of the traveling condition of the subject vehicle at a second flag signal, and being configured to detect a third angle and a fourth angle of two imaginary lines connecting each of the right and left headlight of the subject vehicle to the third point of the vehicle with respect to the optical axis of the camera by using the image data output from the camera, respectively, and the circling detector configured to calculate a second basic value in accordance with the turning radius of the subject vehicle, the third angle and the fourth angle, the vehicle movement detector configured to detect movements including a relative moving angle in a rightward and leftward direction of the vehicle with respect to the subject vehicle when judging the existence of the vehicle in accordance with the first flag signal, configured to store data of said moving conditions at a third flag signal, and the vehicle movement detector being configured to calculate a revised value based upon the relative moving angle, the distance detector configured to compare at least one of the first angle and the second angle detected by the vehicle detector with the second setup value stored in the memory for detecting whether a distance between the subject vehicle and the at least one vehicle is shorter than a setup distance or not, and being configured to store said compared result as a fourth flag signal, the shading area controller configured to calculate boundary data between a shading area and an illuminating area for the right and left headlight of the subject vehicle in accordance with at least one of the basic value, the second basic value and the revised value in view of at least one of the first flag signal, the second flag signal, the third flag signal and the fourth flag signal, and the light distribution controller being configured to output light distribution data in accordance with the boundary data output from the shading area controller.

2. The headlight controller according to claim 1, wherein each of the first point and the second point of the at least one vehicle is a respective one of a right and left rear lamp of the vehicle and each of feature extraction points of the first point and the second point is light with a substantially same brightness at night when the vehicle is a vehicle moving forward in a forward direction of the subject vehicle, and when the vehicle is an oncoming vehicle, each of the first point and the second point of the vehicle is a respective one of a right and left headlight of the oncoming vehicle and each of feature extraction points of the first point and the second point is light with a substantially same brightness at night.

3. The headlight controller according to claim 1, wherein the third point of the at least one vehicle is at least one of a door miller and a front edge in a turning direction of the vehicle and the feature extraction point of the vehicle is an end in the turning direction of the vehicle in view from the subject vehicle.

4. The headlight controller according to claim 2, wherein the third point of the at least one vehicle is at least one of a door miller and a front edge in a turning direction of the vehicle and the feature extraction point of the vehicle is an end in the turning direction of the vehicle in view from the subject vehicle.

5. The headlight controller according to claim 1, wherein the second flag signal for informing the traveling condition of the subject vehicle includes at least three signals of turning right, turning left and taking a straight line.

6. The headlight controller according to claim 2, wherein the second flag signal for informing the traveling condition of the subject vehicle includes at least three signals of turning right, turning left and taking a straight line.

7. The headlight controller according to claim 1, wherein the revised value is configured with a quadratic function of the relative moving angle of the vehicle with respect to the subject vehicle.

8. The headlight controller according to claim 2, wherein the revised value is configured with a quadratic function of the relative moving angle of the vehicle with respect to the subject vehicle.

9. The headlight controller according to claim 1, wherein the third flag signal for informing the moving conditions of the vehicle with respect to the subject vehicle includes at least five signals of big move rightward, small move rightward, no change, big move leftward and small move leftward.

10. The headlight controller according to claim 2, wherein the third flag signal for informing the moving conditions of the vehicle with respect to the subject vehicle includes at least five signals of big move rightward, small move rightward, no change, big move leftward and small move leftward.

* * * * *